United States Patent
Watanabe et al.

(10) Patent No.: US 9,406,975 B2
(45) Date of Patent: Aug. 2, 2016

(54) ALKALI METAL-SULFUR-BASED SECONDARY BATTERY

(71) Applicant: NATIONAL UNIVERSITY CORPORATION YOKOHAMA NATIONAL UNIVERSITY, Yokohama-shi, Kanagawa (JP)

(72) Inventors: Masayoshi Watanabe, Yokohama (JP); Kaoru Dokko, Yokohama (JP); Naoki Tachikawa, Yokohama (JP); Mizuho Tsuchiya, Yokohama (JP); Kazuhide Ueno, Yokohama (JP); Azusa Yamazaki, Yokohama (JP); Kazuki Yoshida, Yokohama (JP); Ryuji Harimoto, Yokohama (JP); Risa Nozawa, Yokohama (JP); Toshihiko Mandai, Yokohama (JP); Ce Zhang, Yokohama (JP); Jun-Woo Park, Yokohama (JP); Yu Onozaki, Tokyo (JP); Masao Iwaya, Tokyo (JP)

(73) Assignee: NATIONAL UNIVERSITY CORPORATION YOKOHAMA NATIONAL UNIVERSITY, Yokohama-Shi, Kanagawa (JP)

(*) Notice: Subject to any disclaimer, the term of this patent is extended or adjusted under 35 U.S.C. 154(b) by 0 days.

(21) Appl. No.: 14/386,759

(22) PCT Filed: Mar. 18, 2013

(86) PCT No.: PCT/JP2013/057618
§ 371 (c)(1),
(2) Date: Sep. 19, 2014

(87) PCT Pub. No.: WO2013/141195
PCT Pub. Date: Sep. 26, 2013

(65) Prior Publication Data
US 2015/0072248 A1 Mar. 12, 2015

(30) Foreign Application Priority Data

Mar. 19, 2012 (JP) ................................ 2012-061694
Mar. 19, 2012 (JP) ................................ 2012-061695
Mar. 19, 2012 (JP) ................................ 2012-061697
Jul. 9, 2012 (JP) ................................ 2012-153485
Jul. 26, 2012 (JP) ................................ 2012-165678

(51) Int. Cl.
*H01M 4/13* (2010.01)
*H01M 10/0567* (2010.01)
(Continued)

(52) U.S. Cl.
CPC ............ *H01M 10/0567* (2013.01); *H01M 4/38* (2013.01); *H01M 4/5815* (2013.01);
(Continued)

(58) Field of Classification Search
CPC .......... H01M 10/052; H01M 10/0567; H01M 10/0568; H01M 10/0569; H01M 2220/20; H01M 2300/0025; H01M 2300/0034; H01M 2300/0037; H01M 4/38; H01M 4/5815; H01M 4/622; Y02T 10/7011
See application file for complete search history.

(56) References Cited

U.S. PATENT DOCUMENTS 7,078,124 B2   7/2006   Kim et al.
7,303,837 B2   12/2007   Jung et al.
(Continued)

FOREIGN PATENT DOCUMENTS

CN   1482693 A   3/2004
CN   1487620 A   4/2004
(Continued)

OTHER PUBLICATIONS

Cheon S-E et al., "Rechargeable Lithium Sulfur Battery", Journal of the Electrochemical Society, 2003, 150 (6), pp. A796-799 (in English).
(Continued)

*Primary Examiner* — Patrick Ryan
*Assistant Examiner* — Ben Lewis
(74) *Attorney, Agent, or Firm* — Holtz, Holtz & Volek PC

(57) ABSTRACT

An alkali metal-sulfur-based secondary battery, in which coulombic efficiency is improved by suppressing a side reaction during charge, and a reduction in discharge capacity by repetition of charge and discharge is suppressed and which has a long battery life and an improved input/output density, includes a positive electrode or a negative electrode containing a sulfur-based electrode active material; an electrolyte solution containing an ether compound such as THF and glyme and a solvent such as a fluorine-based solvent, wherein at least a part of the ether compound and the alkali metal salt forms a complex; and a counter electrode.

13 Claims, 10 Drawing Sheets

(51) Int. Cl.
| | |
|---|---|
| *H01M 4/38* | (2006.01) |
| *H01M 10/052* | (2010.01) |
| *H01M 10/0568* | (2010.01) |
| *H01M 10/0569* | (2010.01) |
| *H01M 4/58* | (2010.01) |
| *H01M 4/62* | (2006.01) |

(52) U.S. Cl.
CPC ........ *H01M10/052* (2013.01); *H01M 10/0568* (2013.01); *H01M 10/0569* (2013.01); *H01M 4/622* (2013.01); *H01M 2200/20* (2013.01); *H01M 2300/0025* (2013.01); *H01M 2300/0034* (2013.01); *H01M 2300/0037* (2013.01); *Y02E 60/122* (2013.01); *Y02T 10/7011* (2013.01)

(56) References Cited

U.S. PATENT DOCUMENTS

| | | | |
|---|---|---|---|
| 2004/0009393 A1 | 1/2004 | Kim et al. | |
| 2004/0048154 A1 | 3/2004 | Jung et al. | |
| 2004/0048164 A1 | 3/2004 | Jung et al. | |
| 2004/0053129 A1 | 3/2004 | Jung et al. | |
| 2004/0121232 A1* | 6/2004 | Kato | H01M 4/136 429/217 |
| 2006/0177741 A1 | 8/2006 | Kolosnitsyn et al. | |
| 2009/0286163 A1 | 11/2009 | Shin et al. | |
| 2011/0020700 A1 | 1/2011 | Iwaya | |
| 2011/0200875 A1 | 8/2011 | Miyuki et al. | |
| 2011/0236766 A1 | 9/2011 | Kolosnitsyn et al. | |
| 2012/0119161 A1* | 5/2012 | Son | H01B 1/122 252/506 |

FOREIGN PATENT DOCUMENTS

| | | | |
|---|---|---|---|
| CN | 102017273 A | 4/2011 | |
| JP | 2002050360 A | 2/2002 | |
| JP | 2004103558 A | 4/2004 | |
| JP | 2004103560 A | 4/2004 | |
| JP | 2005079096 A | 3/2005 | |
| JP | 2005108438 A | 4/2005 | |
| JP | 2008527662 A | 7/2008 | |
| JP | 2010073489 A | 4/2010 | |
| JP | 2012109223 A | 6/2012 | |
| KR | 1020110008172 A | 1/2011 | |
| WO | 2010044437 A1 | 4/2010 | |
| WO | WO 2011/051275 A1 * | 5/2011 | ........ H01M 10/0568 |
| WO | 2011136226 A1 | 11/2011 | |

OTHER PUBLICATIONS

Choi et al., "Rechargeable lithium/sulfur battery with liquid electrolytes containing toluene as additive", Journal of Power Sources, vol. 183, Issue 1, pp. 441-445 (in English).

International Preliminary Report on Patentability (IPRP) dated May 2, 2014 issued in International Application No. PCT/JP2013/057618.

International Search Report (ISR) dated May 21, 2013 issued in International Application No. PCT/JP2013/057618.

Kazuye et al., "Glyme-LiTFSI Complexes as Thermally Stable Electrolytes for Lithium Secondary Batteries", Abstract Book, The 47th Battery Symposium in Japan, pp. 496-497.

Chinese Office Action (and English translation thereof) dated Dec. 21, 2015, issued in counterpart Chinese Application No. 201380015449.9.

Extended European Search Report dated Sep. 24, 2015, issued in counterpart European Application No. 13764474.6.

Japanese Office Action dated Mar. 15, 2016, issued in counterpart Japanese Application No. 2013-048585.

Japanese Office Action dated Mar. 8, 2016, issued in counterpart Japanese Application No. 2013-048583.

Korean Office Action dated Feb. 19, 2016, issued in counterpart Korean Application No. 10-2014-7026024.

Schneider, et al., "Influence of different electrode compositions and binder materials on the performance of lithium-sulfur batteries", Journal of Power Sources; vol. 205; Jan. 11, 2012; pp. 420-425.

* cited by examiner (a)

(b)

(a)

(b)

(a)

(b)

(a)

(b)

ALKALI METAL-SULFUR-BASED SECONDARY BATTERY

TECHNICAL FIELD

The present invention relates to a secondary battery using sulfur for a positive electrode or a negative electrode, such as a lithium-sulfur battery.

BACKGROUND ART

In recent years, high-capacity secondary batteries have been desired with the spread of portable telephone terminals and the research and development of electric vehicles and hybrid electric vehicles to cope with environmental issues. As such a secondary battery, a lithium ion secondary battery has already been widely spread, but a technique of using flame-retardant glymes as an electrolyte solution has been proposed in order to secure safety for mounting on a vehicle (for example, Non Patent Literature 1). Further, a technique has been proposed in which an electrolyte solution prepared in a mixing ratio of a Li salt to glyme of 0.70 to 1.25 on a molar basis is used as an electrolyte solution of a lithium secondary battery, wherein a part of the Li salt and the glyme is allowed to form a complex to thereby improve electrochemical stability (for example, Patent Literature 1).

On the other hand, a lithium-sulfur battery has attracted attention as a secondary battery having a higher capacity than a lithium secondary battery (for example, Patent Literatures 2 and 3). Sulfur has a theoretical capacity of about 1670 mAh/g, which is about 10 times higher than the theoretical capacity of $LiCoO_2$ (about 140 mAh/g) which is a positive electrode active material of a lithium battery, and sulfur also has an advantage of low cost and being rich in resources.

With respect to the lithium-sulfur battery, a technique of using an electrolyte solution prepared in a mixing ratio of a Li salt ($LiCF_3SO_3$) to tetraglyme of about 0.12 to 0.25 on a molar basis ($LiCF_3SO_3$ is 0.5 to 1 mol/L) (for example, Non Patent Literatures 2 and 3); a technique of using an electrolyte solution prepared in a mixing ratio of an alkali metal salt (LiTFSA or the like) to glyme of 0.50 or more on a molar basis by the present inventors (Patent Literature 4); and the like are disclosed.

CITATION LIST

Patent Literature

Patent Literature 1:
Japanese Patent Application Laid-Open Publication No. 2010-73489
Patent Literature 2:
Japanese Patent Application Laid-Open Publication No. 2008-527662
Patent Literature 3:
Japanese Patent Application Laid-Open Publication No. 2005-79096
Patent Literature 4:
Japanese Patent Application Laid-Open Publication No. 2012-109223

Non Patent Literature

Non Patent Literature 1:
Kazunaga et al., "Investigation of lithium secondary battery using glyme-LiTFSI molten complex", Book of Abstracts of Battery Symposium, VoL. 47, pp. 496-497, 2006
Non Patent Literature 2:
Journal of Power Sources, 183, pp. 441-445, 2008
Non Patent Literature 3:
Journal of the Electrochemical Society, 150 (6), A796-799, 2003

SUMMARY OF INVENTION

Technical Problem

However, according to studies by the present inventor, it has been found that when tetraglyme and a Li salt are used as an electrolyte solution in a lithium-sulfur battery, coulombic efficiency (discharge capacity/charge capacity) is reduced due to an occurrence of a side reaction during charge and discharge, and discharge capacity is significantly reduced by repetition of charge and discharge to reduce battery life. It is conceivable that the side reaction is elution of lithium polysulfide ($Li_2S_n$; $1 \leq n \leq 8$) produced during charge and discharge into the electrolyte solution. Further, improvement in input/output density of the lithium-sulfur battery is also a challenge.

Therefore, an object of the present invention is to provide an alkali metal-sulfur-based secondary battery in which the coulombic efficiency is improved by suppressing a side reaction during charge and discharge, and a reduction in discharge capacity by the repetition of charge and discharge is suppressed and which has a long battery life and an improved input/output density.

Means for Solving the Problem

The present inventors have found that the above problems can be solved by using an electrolyte containing an ether compound and an alkali metal salt in a specific ratio and a solvent which has hydrophobicity, is completely mixed with a complex formed from the ether compound and the alkali metal salt, and does not chemically react with the alkali metal and an alkali metal polysulfide ($M_2S_n$: $1 \leq n \leq 8$). This finding has led to completion of the present invention.

That is, the present invention provides an alkali metal-sulfur-based secondary battery including:
a positive electrode or a negative electrode containing a sulfur-based electrode active material including at least one selected from a group consisting of elemental sulfur, a metal sulfide, a metal polysulfide, and an organic sulfur compound;
an electrolyte solution containing an ether compound represented by the following formula:

$$R^1\text{—}(OCHR^3CH_2)_x\text{—}OR^2 \qquad \text{[Formula 1]}$$

(wherein $R^1$ and $R^2$ are each independently selected from a group consisting of an alkyl group having 1 to 9 carbon atoms which may be substituted with fluorine, a phenyl group which may be substituted with a halogen atom, and a cyclohexyl group which may be substituted with a halogen atom, wherein $R^1$ and $R^2$ may be combined together to form a ring; $R^3$ each independently represents H or $CH_3$; and x represents 0 to 10), an alkali metal salt, and a solvent, wherein at least a part of the ether compound and the alkali metal salt forms a complex, and when ether oxygen of the ether compound is represented by [O], [O]/the alkali metal salt (molar ratio) is 2 to 10; and
a counter electrode which is a counter electrode of the positive electrode or the negative electrode and contains the alkali metal, an alloy containing the alkali metal, carbon, or an active material which intercalates and deintercalates an alkali metal ion, wherein the solvent is one or two or more selected from a group consisting of a fluorine-based solvent, an ionic liquid, and toluene, which has hydrophobicity, is completely mixed with the complex, and does not chemically react with the alkali metal and an alkali metal polysulfide ($M_2S_n$: $1 \leq n \leq 8$).

Advantageous Effects of Invention

According to the present invention, an alkali metal-sulfur-based secondary battery can be obtained in which coulombic efficiency is improved by suppressing a side reaction during charge and discharge, and a reduction in discharge capacity by the repetition of charge and discharge is suppressed and which has a long battery life and an improved input/output density.

DESCRIPTION OF EMBODIMENTS

Figure 1:
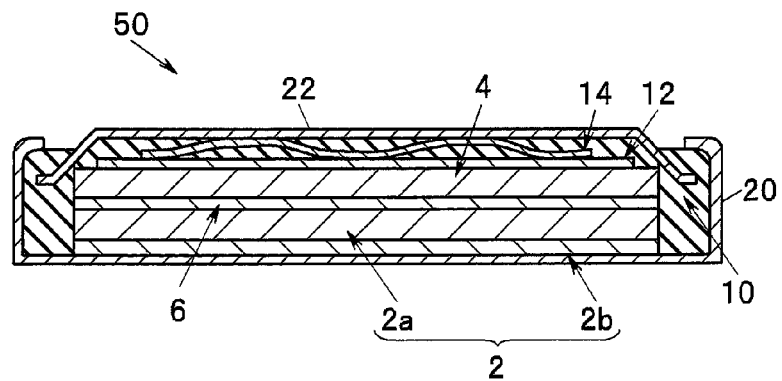
FIG. 1 is a sectional view showing an example constituting a lithium-sulfur battery used in Examples.

Hereinafter, the embodiments of the present invention will be described. An alkali metal-sulfur-based secondary battery according to the present invention includes a positive electrode or a negative electrode containing a sulfur-based electrode active material, an electrolyte solution containing the following ether compound and alkali metal salt, and a counter electrode of the positive electrode or the negative electrode.

Note that examples of the alkali metal-sulfur-based secondary battery according to the present invention include, but are not limited to, a lithium-sulfur battery and a sodium-sulfur battery which are batteries in which a positive electrode contains a sulfur-based electrode active material; and a sulfur-$LiCoO_2$ battery and a sulfur-$LiMn_2O_4$ battery which are batteries in which a negative electrode contains a sulfur-based electrode active material.

The alkali metal-sulfur-based secondary battery according to the present invention, for example, has a structure in which the positive electrode or the negative electrode and the counter electrode as described above are arranged spaced-apart through a separator and an electrolyte solution is contained in the separator to constitute a cell, and a plurality of the cells are laminated or wound and placed in a case. Current collectors of a positive electrode or a negative electrode and a counter electrode are each withdrawn to outside of the case, and electrically connected to tabs (terminals). Note that the electrolyte solution may be a gel electrolyte.

The alkali metal-sulfur-based secondary battery can be produced by conventionally known methods.

<Positive Electrode or Negative Electrode Containing Sulfur-Based Electrode Active Material>

A positive electrode or a negative electrode contains a sulfur-based electrode active material including at least one selected from a group consisting of elemental sulfur, a metal sulfide, a metal polysulfide, and an organic sulfur compound. Examples of the sulfur-based metal sulfide include lithium polysulfide; $Li_2S_n$ ($1 \leq n \leq 8$), and examples of the sulfur-based metal polysulfide include $MS_n$ (M=Ni, Co, Cu, Fe, Mo, Ti, $1 \leq n \leq 4$). Further, examples of the organic sulfur compound include an organic disulfide compound and a carbon sulfide compound.

The positive electrode or the negative electrode as described above may also contain the sulfur-based electrode active material as described above, and a binder and/or a conducting agent. Then, a slurry (paste) of these electrode materials can be applied to a conductive carrier (current collector) and dried to thereby allow the carrier to carry the electrode material to produce the positive electrode or the negative electrode. Examples of the current collector include a current collector obtained by forming a conductive metal such as aluminum, nickel, copper, and stainless steel into a foil, a mesh, an expanded grid (expanded metal), a punched metal, and the like. Further, a resin having conductivity or a resin containing a conductive filler may be used as a current collector. The thickness of the current collector is, for example, 4 to 30 μm, but is not limited thereto.

The content of the sulfur-based electrode active material in the above-described electrode materials (the total amount of the sulfur-based electrode active material and other components excluding the current collector) is preferably 50 to 98% by mass, more preferably 80 to 98% by mass. When the content of the active material is in the above range, the energy density can be suitably increased.

Thickness of the electrode materials (thickness of one of coating layers) is preferably 10 to 500 μm, more preferably 20 to 300 μm, further preferably 20 to 150 μm.

Examples of the binder include polyethylene (PE), polypropylene (PP), polyethylene terephthalate (PET), polyethernitrile (PEN), polyimide (PI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polyvinyl alcohol (PVA), polyacrylic acid (PAA), lithium polyacrylate (PAALi), polyalkylene oxide such as a ring-opened polymer of ethylene oxide and a mono-substituted epoxide, and mixtures thereof.

An anionic polymer is preferred as a binder. When the anionic polymer is used as a binder, a side reaction during charge and discharge can be suppressed to improve coulombic efficiency.

The anionic polymer is (1) a polymer having an acidic group, (2) an alkali metal salt type polymer using an alkali metal contained in a negative electrode as a counter cation of an acidic group, or (3) a non-alkali metal ion type polymer using an ion other than an alkali metal ion as a counter cation of an acidic group.

Examples of (1) the polymer having an acidic group include polyacrylic acid (PAA), polymethacrylic acid (PMA), polystyrene sulfonic acid (PSSA), poly(lithium acrylamido-methylpropanesulfonate) (PAMPSA), polyvinylsulfonic acid (PVSA), Nafion (registered trademark), sulfonated polyimide (PSPI), and carboxymethyl cellulose (CMC).

Note that the polymer having an acidic group is partly ionized in an electrolyte solution and shows anionic properties.

Example of (2) the alkali metal salt type polymer can be prepared by neutralizing (1) the polymer having an acidic group as described above with an alkali metal hydroxide. For example, when Li is used as an alkali metal, the alkali metal salt type polymer can be prepared by neutralizing polyacrylic acid (PAA) with LiOH. When Li is used as an alkali metal, specific examples of the alkali metal salt type polymer to be used as a binder include:

poly(lithium acrylate) (PALi) represented by

[Formula 6]

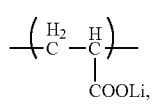

Nafion (registered trademark) lithium salt (Nafion-Li) represented by

[Formula 7]

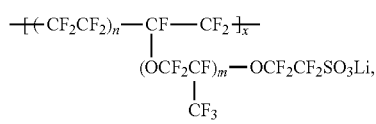

poly(lithium methacrylate) (PMALi) represented by

[Formula 8]

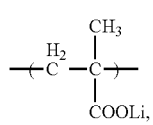

poly(lithium styrene sulfonate) (PSSLi) represented by

[Formula 9]

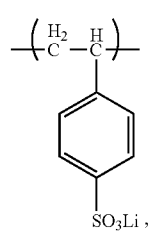

poly(lithium acrylamido-methylpropanesulfonate) (PAMPSLi) represented by

[Formula 10]

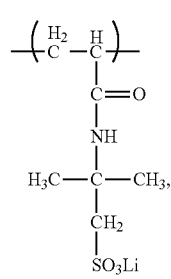

poly(lithium vinylsulfonate) (PVSLi) represented by

[Formula 11]

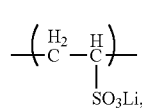

a sulfonated polyimide lithium salt (PSPI-Li) represented by

[Formula 12]

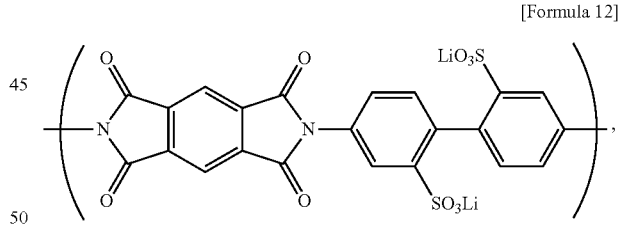

and a carboxymethyl cellulose lithium salt (CMC-Li) represented by

[Formula 13]

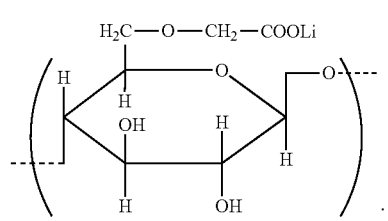

Note that n, m, and x in the chemical formula of Nafion-Li described above are natural numbers.

Examples of (3) the non-alkali metal ion type polymer include a polymer using an ammonium salt as a counter cation of an acidic group. Specific examples include poly(tetraethylammonium acrylate), poly(1-ethyl-3-methylimidazolium acrylate), and poly(tetrabutylphosphonium acrylate).

The conducting agent is an additive blended in order to improve conductivity, and examples thereof include carbon powder such as graphite, Ketjen Black, inverse opal carbon, and acetylene black and various carbon fibers such as vapor-grown carbon fibers (VGCF) and carbon nanotubes (CNT). Further, the electrode material may also contain a supporting electrolyte (a component contained in the following electrolyte solution).

<Counter Electrode>

When a positive electrode contains the sulfur-based electrode active material as described above, a negative electrode serving as a counter electrode contains one or two or more negative electrode active materials selected from a group consisting of lithium, sodium, a lithium alloy, a sodium alloy, and a composite of lithium/inert sulfur. The negative electrode active materials contained in the negative electrode act so as to intercalate and deintercalate an alkali metal ion. The negative electrode active material is preferably at least one selected from a group consisting of lithium, sodium, carbon, silicon, aluminum, tin, antimony, and magnesium. More specifically, conventionally known negative electrode materials can be used, such as metallic materials such as lithium titanate, lithium metal, sodium metal, a lithium-aluminum alloy, a sodium-aluminum alloy, a lithium-tin alloy, a sodium-tin alloy, a lithium-silicon alloy, a sodium-silicon alloy, a lithium-antimony alloy, and a sodium-antimony alloy; and carbon materials such as crystalline carbon materials and amorphous carbon materials, such as natural graphite, artificial graphite, carbon black, acetylene black, graphite, activated carbon, carbon fibers, coke, soft carbon; and hard carbon. Among these, a carbon material, lithium, or a lithium-transition metal composite oxide is desirably used because a battery excellent in capacity and input output characteristics can be constituted. Optionally, two or more negative electrode active materials may be used in combination.

When the negative electrode contains the sulfur-based electrode active material as described above, a positive electrode containing positive electrode active materials intercalating and deintercalating an alkali metal ion may be used as a positive electrode serving as a counter electrode. The positive electrode active material is preferably a lithium-transition metal composite oxide, and examples thereof include Li—Mn-based composite oxides such as $LiMn_2O_4$ and Li—Ni-based composite oxides such as $LiNiO_2$. More specific examples preferably include $LiMn_2O_4$, $LiCoO_2$, $LiNiO_2$, $LiFePO_4$, $LiMnPO_4$, $LiCo_{0.5}Ni_{0.5}O_2$, and $LiNi_{0.7}Co_{0.2}Mn_{0.1}O_2$. A substance other than lithium may be used without limitation as long as the substance electrochemically inserts and deintercalates an alkali metal ion, and examples thereof include sodium. Two or more positive electrode active materials may be used in combination.

The counter electrode may also contain the active material, the binder, and the conducting agent as described above. Then, these electrode materials can be carried on a conductive carrier (current collector) to produce a counter electrode. The same substances as described above can be used as the current collector.

Note that also when the negative electrode contains the sulfur-based electrode active material as described above, an electrolyte solution to be described below can be used.

Further, an alkali metal; an oxide of an alkali metal; a sulfur-based electrode active material containing at least one selected from a group consisting of elemental sulfur, a metal sulfide, a metal polysulfide, and an organic sulfur compound; or oxygen; may be used as a positive electrode active material. Optionally, two or more positive electrode active materials may be used in combination in the positive electrode.

Examples of the negative electrode that can be used include conventionally known negative electrode materials such as carbon materials such as crystalline carbon materials and amorphous carbon materials, such as natural graphite, artificial graphite, carbon black, acetylene black, graphite; activated carbon, carbon fibers, coke, soft carbon, and hard carbon.

The negative electrode may contain an active material including the carbon materials as described above, a binder, and a conducting agent. Then, a slurry (paste) of these electrode materials can be applied to a conductive carrier (current collector) and dried to thereby allow the carrier to carry the electrode materials to produce the negative electrode. Examples of the current collector include a current collector obtained by forming a conductive metal such as aluminum, nickel, copper, and stainless steel into a foil, a mesh, an expanded grid (expanded metal), a punched metal, and the like. Further, a resin having conductivity or a resin containing a conductive filler may be used as a current collector. The thickness of the current collector is, for example, 5 to 30 but is not limited thereto.

A separator is arranged between the positive electrode and the negative electrode. Examples of the separator include a separator made of glass fibers, a porous sheet made of polymers, and nonwoven fabrics, which absorb and hold an electrolyte solution to be described below. The porous sheet is, for example, constituted by a fine porous polymer. Examples of polymers which constitute such a porous sheet include polyolefins such as polyethylene (PE) and polypropylene (PP); a laminate having a three-layer structure of PP/PE/PP, polyimide, and aramid. A polyolefin-based fine porous separator and a separator made of glass fibers are particularly preferred because these separators have properties of being chemically stable to an organic solvent and can reduce reactivity with an electrolyte solution. A thickness of a separator made of a porous sheet is not limited, but in an application of a secondary battery for driving a motor of vehicles, the separator is preferably made of a single-layer or a multi-layer having a total thickness of 4 to 60 µm. Further, the separator made of a porous sheet preferably has a fine pore size of at most 10 µm or less (generally about 10 to 100 nm) and a porosity of 20 to 80%.

Conventionally known nonwoven fabrics such as cotton, rayon, acetate, nylon (registered trademark), and polyester; polyolefins such as PP and PE; polyimide, and aramid are used as nonwoven fabrics singly or in combination. The porosity of the nonwoven fabric separator is preferably 50 to 90%. Further, a thickness of the nonwoven fabric separator is preferably 5 to 200 µm, particularly preferably 10 to 100 µm. If the thickness is less than 5 µm, retention of an electrolyte may become deteriorated, and if the thickness exceeds 200 µm, resistance may be increased.

<Electrolyte Solution>

The electrolyte solution of the present application contains an ether compound, an alkali metal salt, and a solvent.

The ether compound is represented by the following formula.

$$R^1—(OCHR^3CH_2)_x—OR^2 \quad \text{[Formula 1]}$$

In the formula, $R^1$ and $R^2$ are each independently selected from a group consisting of an alkyl group having 1 to 9 carbon atoms which may be substituted with fluorine, a phenyl group which may be substituted with a halogen atom, and a cyclohexyl group which may be substituted with a halogen atom.

Examples of the alkyl group in the above formula include a methyl group, an ethyl group, a propyl group, an isopropyl group, a butyl group, an isobutyl group, a pentyl group, an isopentyl group, a hexyl group, a heptyl group, an octyl group, and a nonyl group. These alkyl groups may be substituted with fluorine in any position. If the number of carbon atoms in the alkyl group exceeds 9, polarity of the ether compound will become weak. Therefore, solubility of the alkali metal salt tends to be reduced. Therefore, the alkyl group preferably has a small number of carbon atoms, and is preferably a methyl group and an ethyl group, most preferably a methyl group.

Examples of the phenyl group which may be substituted with a halogen atom include, but are not particularly limited thereto, a 2-chlorophenyl group, a 3-chlorophenyl group, a 4-chlorophenyl group, a 2,4-dichlorophenyl group, a 2-bromophenyl group, a 3-bromophenyl group, a 4-bromophenyl group, a 2,4-dibromophenyl group, a 2-iodophenyl group, a 3-iodophenyl group, a 4-iodophenyl group, and a 2,4-iodophenyl group.

Examples of the cyclohexyl group which may be substituted with a halogen atom include, but are not particularly limited thereto, a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, a 4-bromocyclohexyl group, a 2,4-dibromocyclohexyl group, a 2-iodocyclohexyl group, a 3-iodocyclohexyl group, a 4-iodocyclohexyl group, and a 2,4-diiodocyclohexyl group.

$R^3$ represents H or $CH_3$, and when x is two or more, $R^3$ are each independent from each other.

A repeating number of ethylene oxide units is represented by x, and x represents 0 to 10. It is preferred that x be 1 to 6, more preferably 2 to 5, most preferably 3 or 4.

Examples of the ether compound include tetrahydrofuran (THF), 1,3-dioxolane, 1,4-dioxane, glyme, and derivatives thereof.

Ether compounds represented by the above general formula (Formula 1) may be combined together to form a ring. Examples of the ring compound include tetrahydrofuran (THF) and a derivative thereof, 2-methyltetrahydrofuran, when x is 0; and 1,3-dioxolane and 1,4-dioxane when x is 1.

Glyme is represented by the above general formula (Formula 1) (wherein $R^3$ represents H, x represents 1 or more, and glyme is a linear compound), including monoglyme (G1, x=1), diglyme (G2, x=2), triglyme (G3, x=3), tetraglyme (G4, x=4), pentaglyme (G5, x=5), and glymes of the following formulas:

[Formula 14]

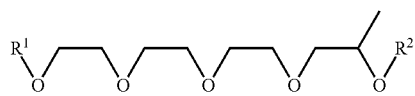

[Formula 15]

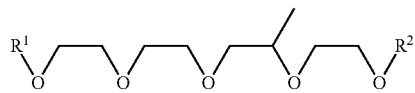

(wherein $R^1$ and $R^2$ are defined in same manner as in the above). Examples of monoglyme (G1) include methyl monoglyme and ethyl monoglyme, and examples of diglyme (G2) include ethyli diglyme and butyl diglyme.

When glyme in which x is 1 to 10 is used as the ether compound, thermal stability, ion conductivity, and electrochemical stability of an electrolyte solution can be further improved to provide an electrolyte solution that can endure high voltage.

The ether compound to be used for an electrolyte solution may be used singly or in combination of two or more.

Oxidation potential of an electrolyte solution changes also with a type of the ether compound. Therefore, when application to a secondary battery is taken into consideration, it is preferred to adjust a mixing ratio etc. so that oxidation potential may be 3.5 to 5.3 V vs $Li/Li^+$. Oxidation potential is more preferably 4.0 to 5.3 V vs $Li/Li^+$.

As the ether compound of the present invention, triglyme (G3) and tetraglyme (G4) are preferred.

The alkali metal salt can be represented by MX, wherein M is an alkali metal, and X is a substance to be used as a counter anion. The above alkali metal salt may be used singly or in combination of two or more.

All alkali metals which are used for general batteries as a supporting electrolyte or an active material can be used as M without particular limitation. Specific examples thereof include Li, Na, K, Rb, and Cs. Specific examples thereof more preferably include Li, Na, and K, most preferably Li in terms of general-purpose properties.

X is preferably at least one selected from a group consisting of Cl, Br, I, $BF_4$, $PF_6$, $CF_3SO_3$, $ClO_4$, $CF_3CO_2$, $AsF_6$, $SbF_6$, $AlCl_4$, $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R^4BF_3$ (wherein $R^4F$=n-$C_mF_{2m+1}$, m=a natural number of 1 to 4, and n represents normal), and $R^5BF_3$ (wherein $R^5$=n-$C_pH_{2p+1}$, p=a natural number of 1 to 5, and n represents normal), but is not particularly limited thereto. X is more preferably $N(CF_3SO_2)_2$, $N(CF_3CF_2SO_2)_2$, and $PF_6$ in terms of solubility in an ether compound and ease of forming a complex structure.

Here, when an ether oxygen of the ether compound is represented by [O], [O]/the alkali metal salt (molar ratio) is preferably 2 to 10, more preferably 2 to 6, further preferably 3 to 5.

At least a part of the ether compound and the alkali metal salt described above forms a complex, which can be determined by thermogravimetry of an electrolyte solution obtained by mixing the ether compound and the alkali metal salt. That is, an ether compound that has formed a complex does not easily volatilize compared with an ether compound that has not formed a complex. Therefore, when weight loss by thermogravimetry of only an ether compound is used as a basis, an electrolyte solution in which weight loss with temperature is less than the basis is regarded as an electrolyte solution in which at least a part of an ether compound and an alkali metal salt forms a complex.

Figure 2:
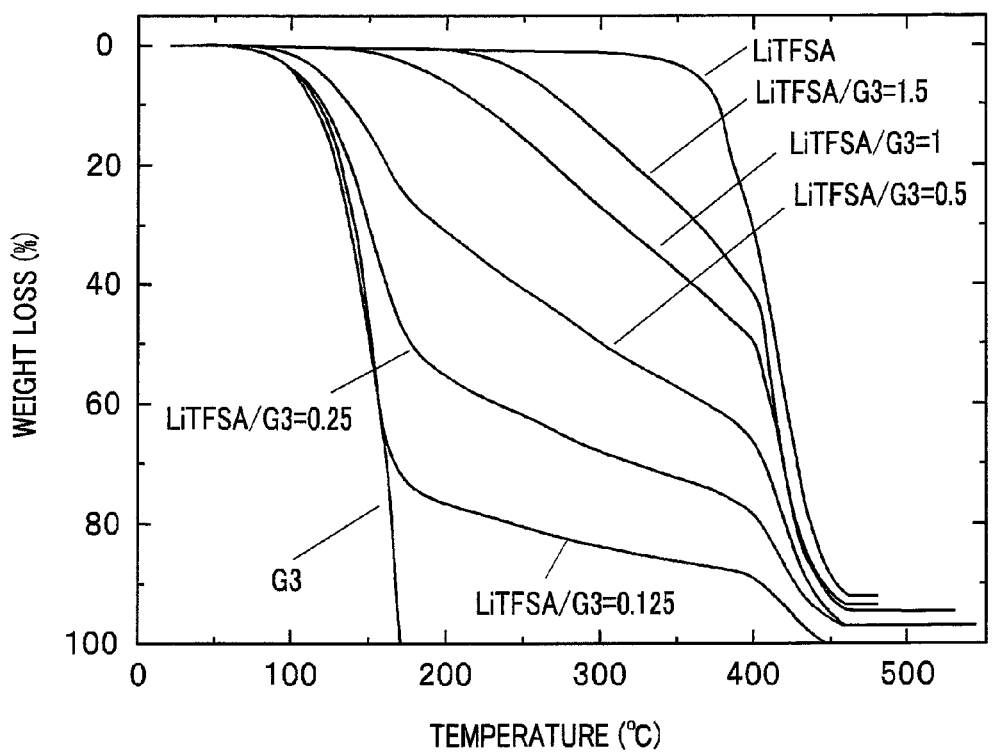
FIG. 2 is a view showing results of thermogravimetry of an electrolyte solution containing triglyme and an alkali metal salt (LiTFSA).
Figure 3:
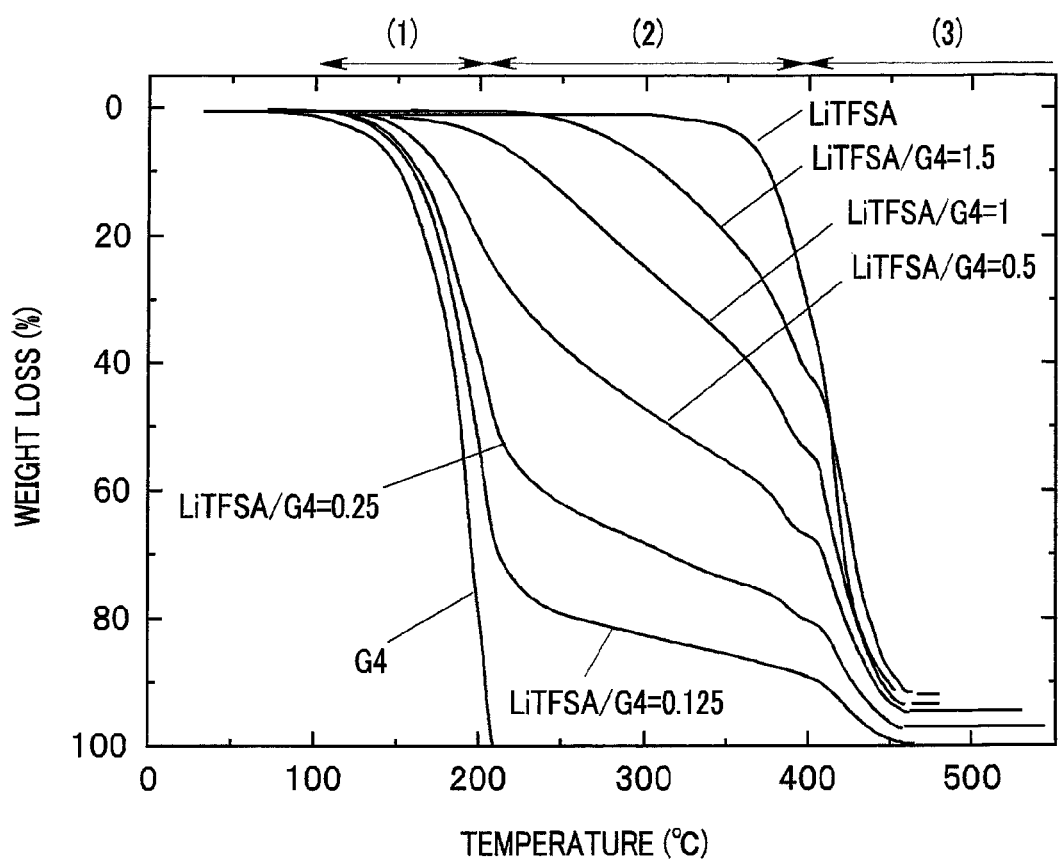
FIG. 3 is a view showing results of thermogravimetry of an electrolyte solution containing tetraglyme and an alkali metal salt (LiTFSA).

FIGS. 2 and 3 show graphs of results of thermogravimetry (relationship between temperature increase and weight loss) of electrolyte solutions in which triglyme (G3) and tetraglyme (G4) (in the above chemical formula 1, R is a methyl group, and x is 3 and 4, respectively) were used as the ether compound, respectively, and LiTFSA ($LiN(CF_3SO_2)_2$) to be described below was used as the alkali metal salt. Note that electrolyte solutions were prepared in which a mixing ratio (on a molar basis) of LiTFSA to each glyme was changed, and thermogravimetry was performed by increasing temperature of electrolyte solutions at a heating rate of 10° C. $min^{-1}$ from room temperature to 550° C. Further, a simultaneous thermogravimetric/differential thermal analysis instrument (TG/DTA 6200 manufactured by Seiko Instruments Inc.) was used as a measuring apparatus.

Note that LiTFSA/G3=1 in FIG. 2 shows that the mixing ratio (on a molar basis) of LiTFSA to glyme is 1. Further, a curve shown by G3 in FIG. 2 shows the thermogravimetry of an electrolyte solution containing only triglyme. These are also applied to FIG. 3.

As shown in FIG. 3, it is found that weight loss process proceeds through the following three stages (1) to (3):

(1) weight loss from 100 to 200° C. is derived from evaporation of glyme which has not formed a complex;

(2) weight loss from 200 to 400° C. is derived from evaporation of glyme which has formed a complex; and (3) weight loss from 400° C. or more is derived from thermal decomposition of an alkali metal salt (LiTFSA).

Therefore, when the process of the above (2) can be verified from the results of thermogravimetry, it can be expected that glyme has formed a complex.

Note that in a system in which the mixing ratio (on a molar basis) of LiTFSA to glyme is larger than 1, all the glymes have formed a complex, and therefore, it is found the process of (1) is not included and weight loss starts from 200° C. or more.

A solvent used in the present application is selected from a group consisting of a fluorine-based solvent, an ionic liquid, and toluene, which has hydrophobicity, is completely mixed with the complex, and does not chemically react with the alkali metal and the alkali metal polysulfide: $M_2S_n$ (M is an alkali metal cation, $1 \leq n \leq 8$).

Examples of such a fluorine-based solvent include chlorofluorocarbon (CFC), perfluorocarbon (PFC), hydrochlorofluorocarbon (HCFC), hydrofluorocarbon (HFC), hydrofluoroether (HFE), perfluoropolyether (PFPE), and hydrofluoropolyether (HFPE). The fluorine-based solvent is preferably hydrofluorocarbon (HFC) and hydrofluoroether (HFE), more preferably hydrofluoroether (HFE).

HFC is a compound represented by $C_aF_bH_c$ (wherein a denotes an integer of 3 or more, b denotes an integer of 1 or more, c denotes an integer of 1 or more, and b+c=2a+2 or b+c=2a). Example thereof include 1,1,1,2,2,3,3,4,4,5,5,6,6-tridecafluorooctane.

HFE is a compound represented by $R^d$—O—$R^e$ (wherein $R^d$ and $R^e$ are each independently an alkyl group or a fluorine-containing alkyl group, and at least one of $R^d$ and $R^e$ is a fluorine-containing alkyl group; in addition, the total number of hydrogen atoms contained in $R^d$ and $R^e$ is 1 or more, and the total number of carbon atoms contained in $R^d$ and $R^e$ is 7 to 10). Examples thereof include 2-trifluoromethyl-3-ethoxy-dodecafluorohexane, 1-methyl-2,2,3,4,4,4-hexafluorobutyl (1,1,2,3,3,3-hexafluoropropyl)ether, 1,1,2,2-tetrafluoroethyl (2,2,3,3-tetrafluoropropyl)ether, and 2,2,2-trifluoroethyl(1,1,2,2-tetrafluoroethyl)ether.

According to studies by the present inventor, it has been found that when the above solvent is further added to the above ether compound and alkali metal salt as an electrolyte solution of an alkali metal-sulfur-based secondary battery, input/output density during charge and during discharge is improved. Although the reason is not clear, this is probably because when the electrolyte solution contains the above solvent, ionic conductivity will be increased to facilitate a flow of electric current, and a coefficient of viscosity of the electrolyte solution will be reduced to facilitate permeation of the electrolyte solution to an inner part of pores in a sulfur-carbon composite electrode to increase an interface in which electrodes and the electrolyte solution can undergo electrochemical reaction. Note that a solvent is preferably incombustible, since safety of a battery obtained is improved.

Here, hydrophobicity of a solvent is visually determined by the presence or absence of phase separation when the solvent and distilled water are mixed at a volume ratio of 1:1. When phase separation can be visually recognized, the solvent is regarded as hydrophobic, and when phase separation is absent and the mixture is a uniform mixed solution, the solvent is determined as hydrophilic.

An alkali metal polysulfide: $M_2S_n$ (M is an alkali metal cation, $1 \leq n \leq 8$) produced in a cell reaction process is easily dissolved in a hydrophilic solvent, and in the case of a sulfur positive electrode, dissolution of $M_2S_n$ shows that a side reaction occurs during charge, and coulombic efficiency and discharge capacity will be reduced by repetition of charge and discharge. Thus, when a solvent is hydrophobic, elution of $M_2S_n$ produced during charge and discharge is suppressed, thereby maintaining high coulombic efficiency.

Further, miscibility of a complex and a solvent is visually determined by the presence or absence of phase separation when the complex and the solvent is mixed at a volume ratio of 1:1. Unless the solvent is mixed with the complex, the solvent is not suitable as an electrolyte solution.

Whether a solvent chemically reacts with an alkali metal or not is determined as follows: An alkali metal foil having a size of 1 cm (length)×1 cm (width)×0.02 cm (thickness) is immersed in 2 mL of a solvent for one day. When gloss of the metal foil has been reduced from initial gloss or color of the solvent has changed from initial color by visual observation, it is determined that the solvent chemically reacts with the alkali metal. When the solvent chemically reacts with the alkali metal, a side reaction of a battery occurs, leading to reduction in coulombic efficiency and reduction in retention of discharge capacity (battery life). This is unsuitable.

Whether or not a solvent chemically reacts with an alkali metal polysulfide ($M_2S_n$) was determined by whether or not quantity of electricity required for charging a battery was a threshold value or more. For example, in the case where the alkali metal is Li, if $Li_2S_n$ produced during charge and discharge does not chemically react with the solvent, $Li_2S_n$ will contribute to a charge and discharge reaction. Therefore, a reaction is observed in the vicinity of 2.2 V and 2.0 V during discharge of a battery, and a reaction is observed in the vicinity of 2.4 V during charge. On the other hand, if the solvent reacts with $Li_2S_n$, a charge reaction will not occur. Therefore, in the case of Li, it was considered that a chemical reaction does not occur if quantity of electricity required for charging is 200 mA h g$^{-1}$ or more. Also when the alkali metal is Na or K, it was considered that a chemical reaction does not occur if quantity of electricity required for charging is 200 mA h g$^{-1}$ or more.

Note that when the solvent chemically reacts with the alkali metal polysulfide $M_2S_n$, a side reaction of a battery occurs, causing reduction in coulombic efficiency and reduction in retention of discharge capacity (battery life). This is unsuitable. For example, as shown in an experiment to be described below, it is known that a carbonate-based solvent chemically reacts with $Li_2S_n$ (literature: J. Phys. Chem. C, 115, 25132 (2011)).

Further, an ionic liquid used as a solvent of the present invention is an onium salt having a melting point of 100° C. or less. Examples of the ionic liquid include N-methyl-N-propylpyrrolidinium bis(trifluoromethanesulfonyl)amide (abbreviated as [P13][TFSA]) represented by the following formula 2:

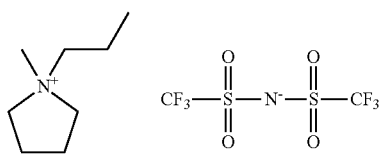

[Formula 2]

Further, a hydrocarbon that satisfies the requirements of the present invention as a solvent is toluene.

In the present invention, a mixing ratio of a solvent to an alkali metal salt {(solvent)/(alkali metal salt)} on a molar basis is preferably 0.50 to 6.0.

If the ratio represented by (solvent)/(alkali metal salt) is less than 0.50 on a molar basis, the amount of the solvent is too small to produce the effect as described above, and input/output density may not be improved. On the other hand, even if the above ratio exceeds 6.0, the effect by the solvent will be saturated, resulting in increase in cost.

In the present invention, a mixing ratio of the above alkali metal salt to the ether compound is preferably 0.50 or more on a molar basis and not more than a value determined by saturated concentration of the above alkali metal salt in the above ether compound.

As described in Non Patent Literatures 2 and 3 described above, it has conventionally been known that, in a lithium-sulfur battery, an electrolyte solution is used in which a mixing ratio of Li salt ($LiCF_3SO_3$) to tetraglyme is prepared to 0.25 or less ($LiCF_3SO_3$ is 1 mol/L or less) on a molar basis. However, according to studies by the present inventor, it has been found that when charge and discharge of such a lithium-sulfur battery are repeated, coulombic efficiency (discharge capacity/charge capacity) is reduced due to the occurrence of a side reaction during charge, and discharge capacity is significantly reduced by repetition of charge and discharge to reduce battery life.

Figure 4:
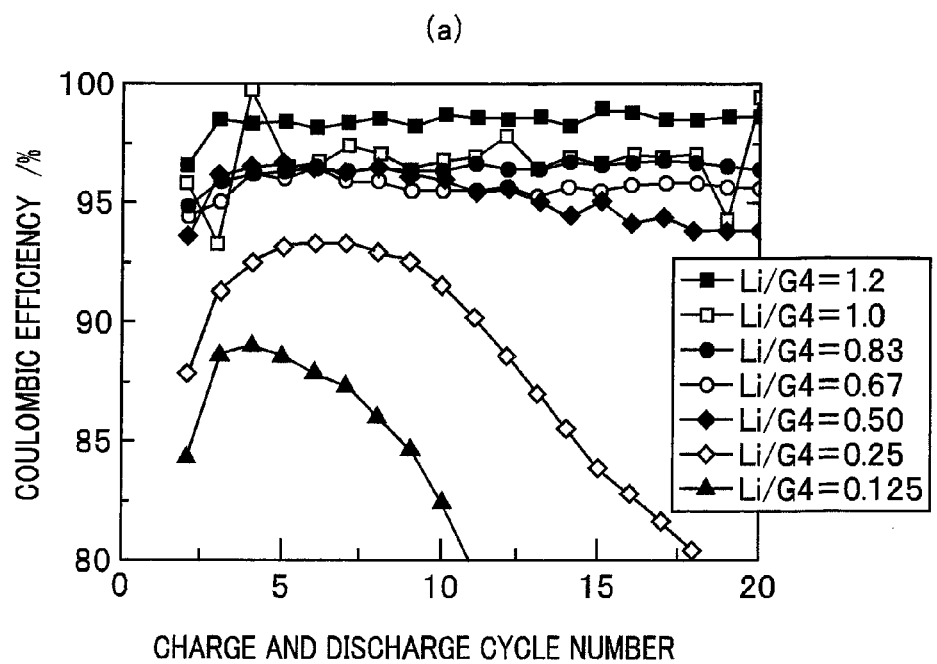
FIG. 4 is a view showing charge and discharge cycle dependence of coulombic efficiency and relationship between coulombic efficiency at 10th cycle and a mixing ratio of a secondary battery containing an electrolyte solution using G4.
Figure 4:
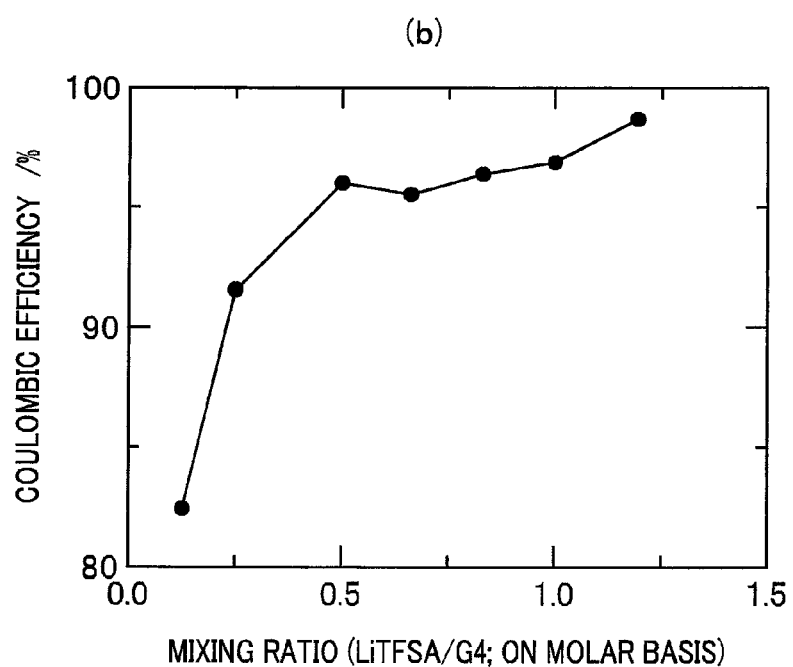
Figure 5:
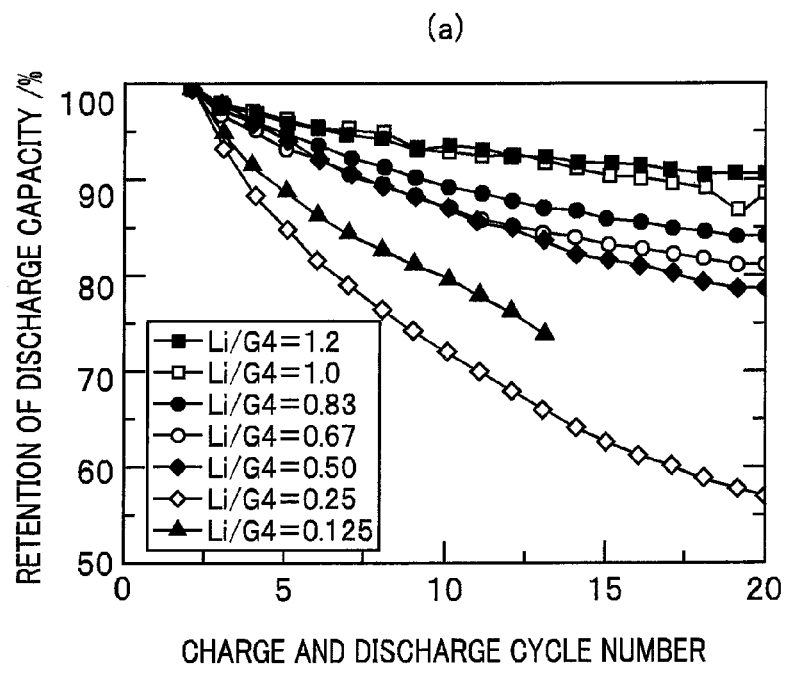
FIG. 5 is a view showing charge and discharge cycle dependence of retention of discharge capacity and relationship between retention of discharge capacity at 10th cycle and a mixing ratio of a secondary battery containing an electrolyte solution using G4.
Figure 5:
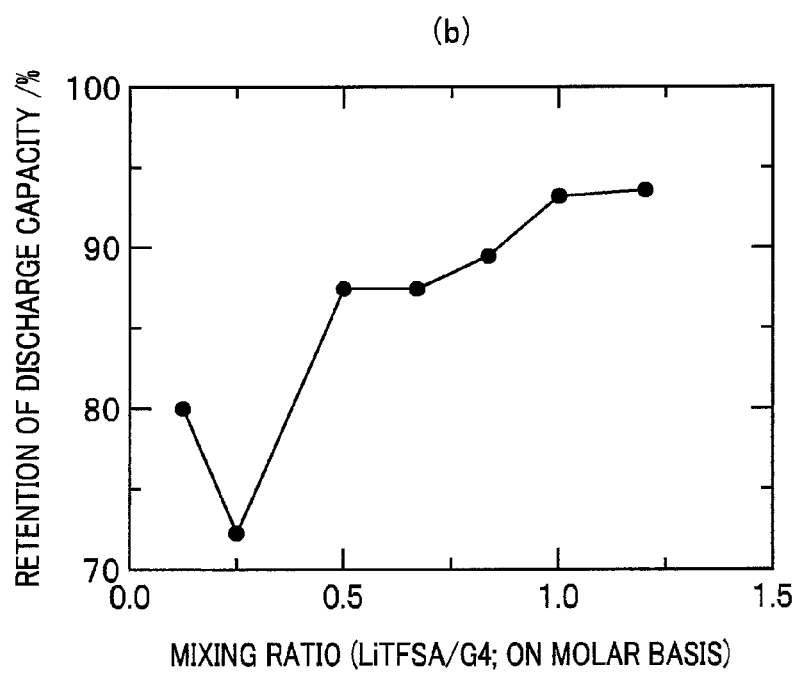
Figure 6:
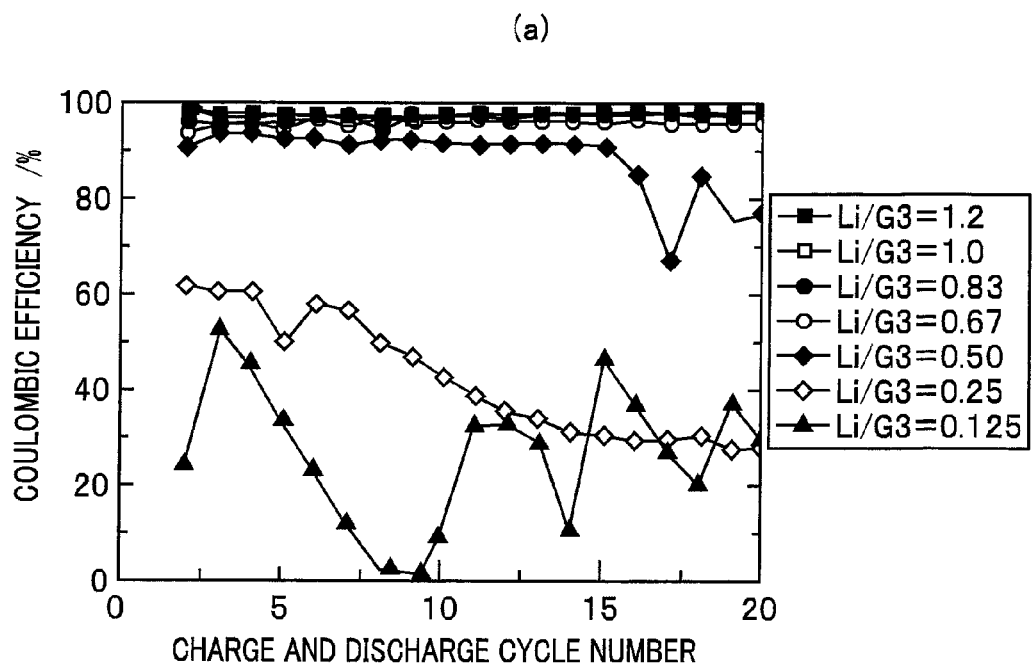
FIG. 6 is a view showing charge and discharge cycle dependence of coulombic efficiency and relationship between coulombic efficiency at 10th cycle and a mixing ratio of a secondary battery containing an electrolyte solution using G3.
Figure 6:
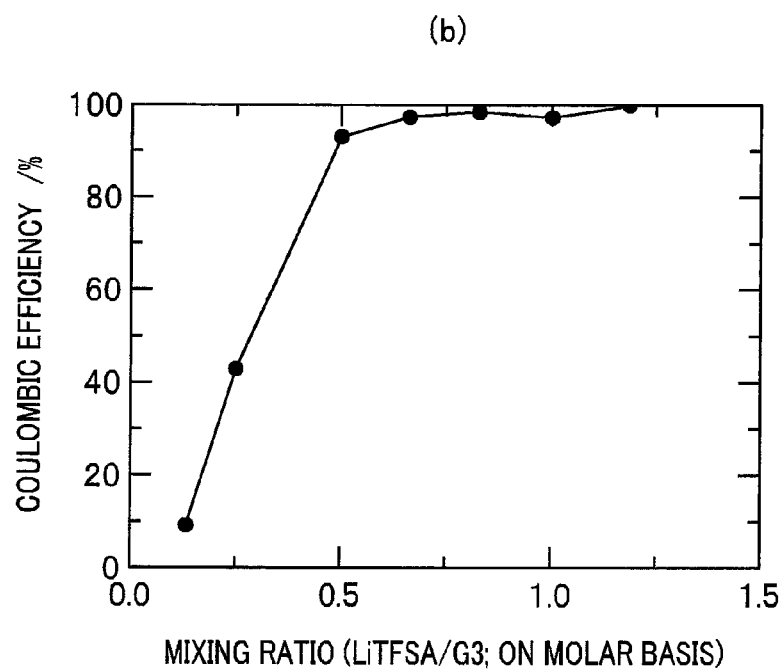
Figure 7:
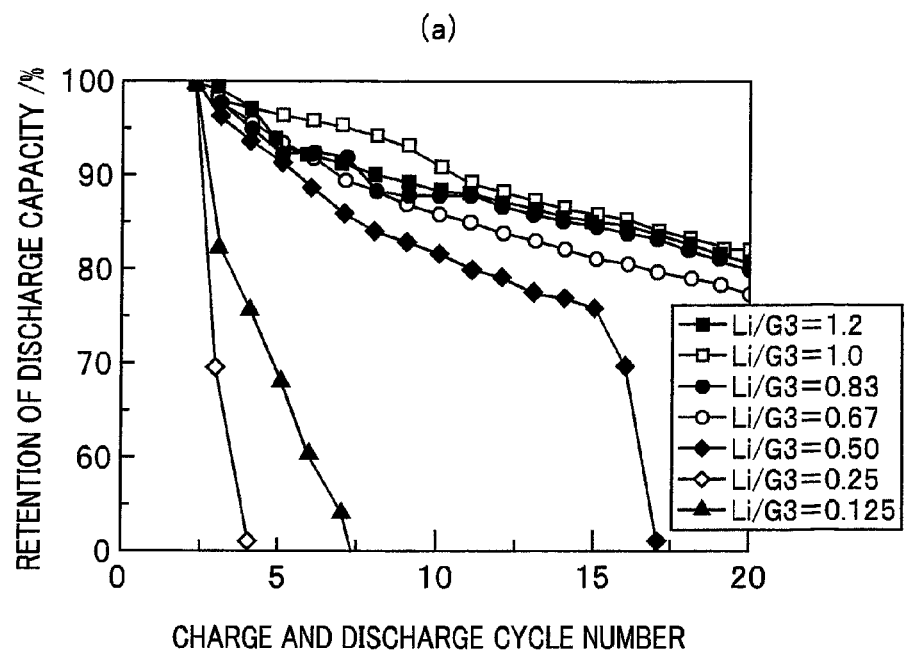
FIG. 7 is a view showing charge and discharge cycle dependence of retention of discharge capacity and relationship between retention of discharge capacity at 10th cycle and a mixing ratio of a secondary battery containing an electrolyte solution using G3.
Figure 7:
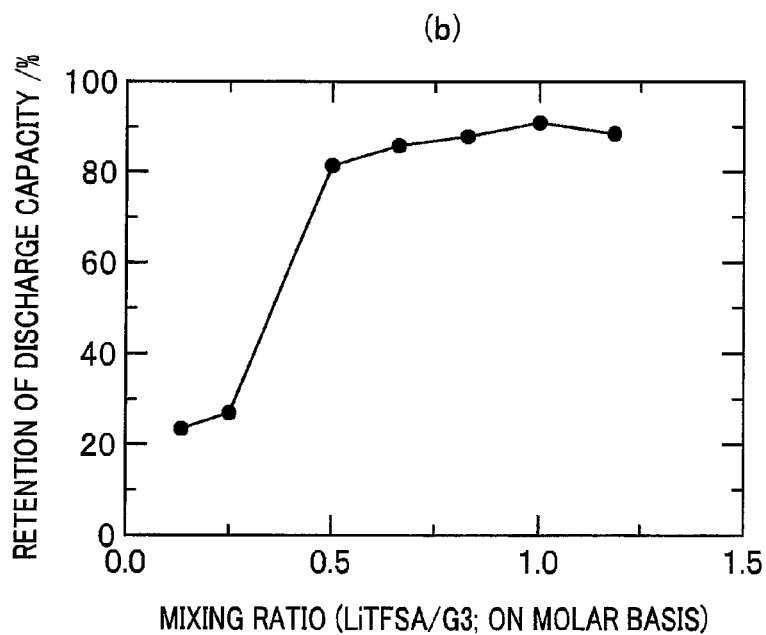

FIG. 4 shows the relationship between a mixing ratio of Li salt (LiTFSA) to glyme (G4) and coulombic efficiency, and FIG. 5 shows the relationship between a mixing ratio of Li salt (LiTFSA) to glyme (G4) and retention of discharge capacity. Similarly, FIG. 6 shows the relationship between a mixing ratio of Li salt (LiTFSA) to glyme (G3) and coulombic efficiency, and FIG. 7 shows the relationship between a mixing ratio of Li salt (LiTFSA) to glyme (G3) and retention of discharge capacity.

If the mixing ratio is 0.50 or more, a side reaction during charge is suppressed to improve the coulombic efficiency to 95% or more and suppress the reduction in discharge capacity by the repetition of charge and discharge to improve the retention of discharge capacity to increase the battery life. Note that coulombic efficiency and retention of discharge capacity are improved as the above mixing ratio is increased, but if the mixing ratio is increased exceeding a value determined by the saturated concentration of the above alkali metal salt in the above ether compound, the alkali metal salt will not dissolve in the ether compound.

From the above, the above mixing ratio is preferably specified in a range of not less than 0.50 on a molar basis and not more than a value determined by the saturated concentration of the above alkali metal salt in the above ether compound.

Note that the saturated concentration of the alkali metal salt in the ether compound is defined as the concentration when the alkali metal salt is dissolved in the ether compound at 30° C., and the solids of the alkali metal salt are able to be visually verified.

When G3 (triethylene glycol dimethyl ether (also referred to as triglyme)) is used as the ether compound and Li salt is used as the alkali metal salt, the above mixing ratio determined by the saturated concentration of the Li salt in G3 is 1.67 on a molar basis.

When tetraglyme (G4) is used as the ether compound and Li salt is used as the alkali metal salt, the above mixing ratio determined by the saturated concentration of the Li salt in G4 is 2.00 on a molar basis.

The electrolyte solution may be a gel electrolyte which is in a gel state. The gel electrolyte has a structure in which an electrolyte solution is injected into a matrix polymer made of an ion-conductive polymer. The electrolyte solution of the present invention as described above is used as the electrolyte solution. Examples of the ion-conductive polymer used as the matrix polymer include polyethylene oxide (PEO), polypropylene oxide (PPO), polyethylene glycol (PEG), polyacrylonitrile (PAN), a copolymer of vinylidene fluoride-hexafluoropropylene (VDF-HEP), poly(methyl methacrylate (PMMA), and copolymers thereof. Electrolyte salt such as lithium salt can be dissolved well in polyalkylene oxide-based polymers.

EXAMPLES

Hereinafter, the present invention will be more specifically described with reference to Examples, but the present invention is not limited to the following Examples. Note that % represents % by mass unless otherwise specified.

Example A

In order to specify the characteristics of the solvent that can be used in the present invention, the hydrophobicity, miscibility with a complex, chemical reactivity with Li, and chemical reactivity with $Li_2S_n$ of solvents were evaluated and summarized in Table 1.

TABLE 1

| | | Solvent | Hydrophobicity | Miscibility with complex | Chemical reaction with Li metal | Chemical reaction with Li2Sn |
|---|---|---|---|---|---|---|
| Example | Fluorine-based | Hydrofluoroether-1 | ○ | ○ | ○ | ○ |
| | Ionic liquid | [P13][TFSA] | ○ | ○ | ○ | ○ |
| | Hydrocarbon-based | Toluene | ○ | ○ | ○ | ○ |
| Comparative Example | Carbonate-based | Propylene carbonate | ○ | ○ | ○ | X |
| | | Ethylene carbonate | X | ○ | ○ | — |
| | | Dimethyl carbonate | X | ○ | X | — |
| | | Diethyl carbonate | ○ | ○ | X | — |
| | Hydrocarbon-based | Hexane | ○ | X | ○ | — |
| | | Cyclohexane | ○ | X | — | — |
| | | Methylcyclohexanone | ○ | X | — | — |

TABLE 1-continued

| | Solvent | Hydrophobicity | Miscibility with complex | Chemical reaction with Li metal | Chemical reaction with Li2Sn |
|---|---|---|---|---|---|
| Ether-based | Triglyme | X | ○ | ○ | ○ |
| | Tetraglyme | X | ○ | ○ | ○ |
| | Anisole | ○ | ○ | X | — |
| Nitrile-based | Acetonitrile | X | ○ | X | — |
| Ester-based | PFPM | ○ | ○ | X | X |
| Alcohol-based | Methanol | X | ○ | X | — |
| | Ethanol | X | ○ | X | — |
| | 1-Propanol | X | ○ | X | — |
| | 2-Propanol | X | ○ | X | — |
| | 1-Butanol | ○ | ○ | X | — |
| Water | Water | X | ○ | X | — |

Examples 1 to 54

Comparative Examples 1 to 20

Experiment with Electrolyte Solution Containing Ether Compound-LiTFSA-Fluorine-Based Solvent <Preparation of Electrolyte Solution>

Triglyme (G3) (manufactured by Kishida Chemical Co., Ltd.) was used as an ether compound.

Further, lithium bis(trifluoromethanesulfonyl)amide (LiTFSA) (manufactured by Morita Chemical Industries Co., Ltd.) represented by the following formula 3 was used as an alkali metal salt.

[Formula 3]

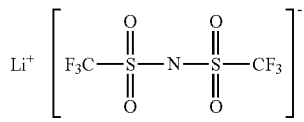

G3 and LiTFSA were mixed in a glove box under an argon atmosphere at a mixing ratio of (LiTFSA)/(G3)=0.5, 1.0, and 1.5 (on a molar basis). Further, $HF_2CF_2CH_2C$—O—$CF_2CF_2H$ (1,1,2,2-tetrafluoroethyl(2,2,3,3-tetrafluoropropyl)ether) (manufactured by Daikin Industries, Ltd., referred to as "Hydrofluoroether-1") which is a fluorine-based solvent was added to the mixture at a predetermined proportion to prepare an electrolyte solution. Note that a mixing ratio of (solvent)/(LiTFSA) was changed to 0.5, 1.0, 2.0, and 4.0.

<Production of Lithium-Sulfur Battery>

Elemental sulfur ($S_8$) was used as a sulfur-based electrode active material. An electrode material 2a (FIG. 1) of a positive electrode was prepared by mixing elemental sulfur in a proportion of 60 wt %, Ketjen Black as a conducting agent in a proportion of 30 wt %, and PVA (polyvinyl alcohol) as a binder in a proportion of 10 wt %. First, elemental sulfur and Ketjen Black were mixed and then heated at 155° C. to prepare a composite of the elemental sulfur and the Ketjen Black. To the mixture, a suitable amount of NMP (N-methylpyrrolidone) in which PVA is dissolved was further added, and the resulting mixture was kneaded to form a slurry. The resulting slurry was applied to an aluminum foil (current collector) 2b having a thickness of 20 μm and then dried at 80° C. for 12 hours to evaporate NMP. The dried foil was then pressed to obtain a positive electrode 2 (FIG. 1). A lithium metal plate having a thickness of 200 μm was stuck to a stainless steel disk having a thickness of 500 μm to produce a negative electrode.

In a glove box under an argon atmosphere, a suitable amount of the above electrolyte solution was added to the positive electrode 2, and the electrolyte solution was immersed in the positive electrode 2 at 60° C. for 60 minutes. The positive electrode 2 and the negative electrode (counter electrode) 4 were laminated through a separator 6 (a glass separator having a thickness of 200 μm manufactured by Toyo Roshi Kaisha, Ltd. (trade name: GA-55)). The above electrolyte solution was further injected into the laminate, which was then sealed in a 2032-type coin cell case 20 (made of SUS304 and having a thickness of 3.2 mm). A spacer 12 was mounted on the negative electrode (counter electrode) 4. A spring 14 was arranged on the spacer 12. The coin cell case 20 was sealed with a lid 22 from the top of the spring 14 to produce a lithium-sulfur battery 50 having a structure shown in FIG. 1. Note that a gasket 10 is interposed on the side wall of the coin cell case 20.

<Evaluations>

(1) Charge Rate Characteristics

A secondary battery obtained as described above was subjected to constant-current discharge at a discharge current density of 1/12 C (12 hour rate, a current value in which theoretical capacity of an electrode active material is discharged in n (hours) is represented by 1/n C rate), and then charge rate characteristics (charge capacity) were evaluated at various charge current densities. Voltage was set to a range of 1.5 to 3.3 V, and evaluation was performed in a temperature controlled bath maintained at a constant temperature of 30° C.

Particularly, charge capacity when charge current density is set to 1/3 C rate (3 hour rate) was defined as "charge capacity at 1/3 C rate", which was considered as an index of input characteristics. Note that the charge capacity at 1/3 C rate is preferably as large as possible because rapid charge is possible.

(2) Discharge Rate Characteristics

The secondary battery obtained as described above was subjected to constant-current charge at a charge current density of 1/12 C, and then discharge rate characteristics (discharge capacity) were evaluated at various discharge current densities. Voltage was set to a range of 1.5 to 3.3 V, and the evaluation was performed in a temperature controlled bath maintained at a constant temperature of 30° C.

Particularly, discharge capacity when discharge density is set to 1/5 C rate (5 hour rate) was defined as "discharge capacity at 1/5 C rate", which was considered as an index of output characteristics. Note that the discharge capacity at 1/5 C rate is preferably as large as possible because rapid discharge is possible.

(2) Coulombic Efficiency, Charge and Discharge Capacity, and Retention of Discharge Capacity From the resulting charge capacity and discharge capacity (mAh/g: g means per mass of elemental sulfur), coulombic efficiency (%)=discharge capacity/charge capacity was determined at each cycle of the charge and discharge cycle. Coulombic efficiency is a value that shows how much quantity of electricity charged can be taken out at discharge, and the efficiency is better when the value is closer to 100(%).

Further, retention of discharge capacity (%)=discharge capacity at the nth cycle/discharge capacity at the 2nd cycle was determined. The retention of discharge capacity is a value that shows stability of the repetition of charge and discharge, and the retention is better when the value is closer to 100(%).

Figure 11:
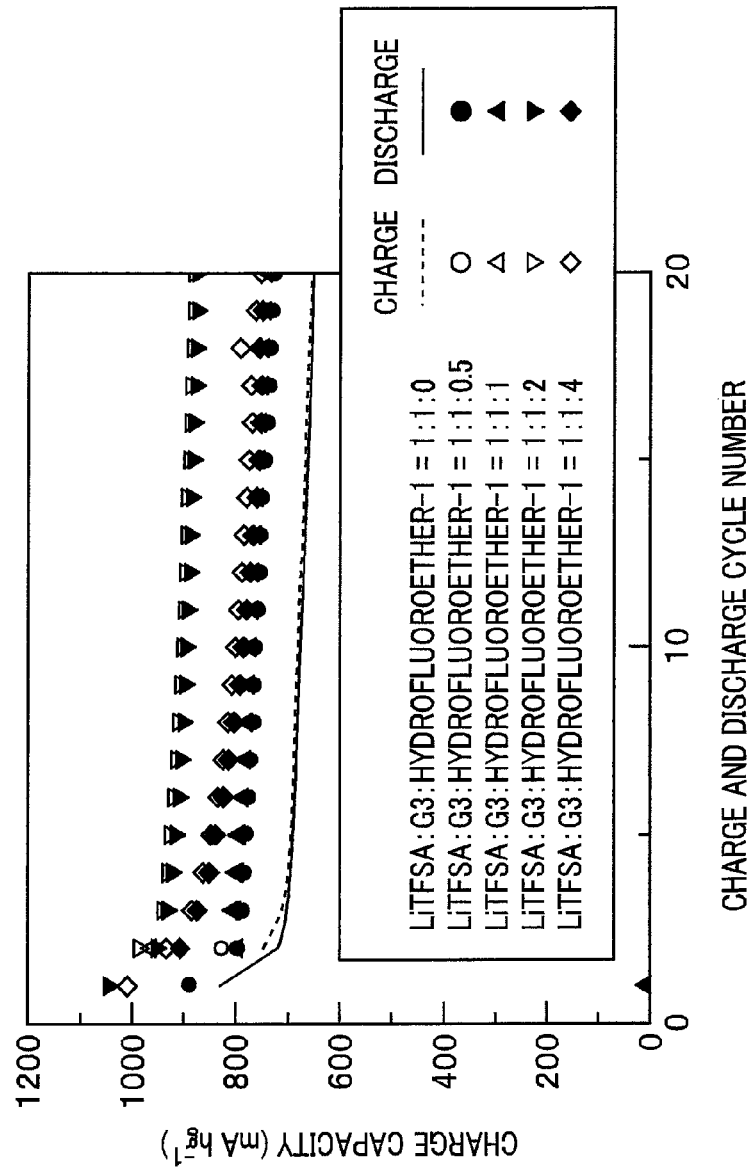
FIG. 11 is a view showing charge and discharge cycle dependence of charge and discharge capacity of a secondary battery in which G3 is used and a mixing ratio of a solvent in an electrolyte solution is changed.
Figure 12:
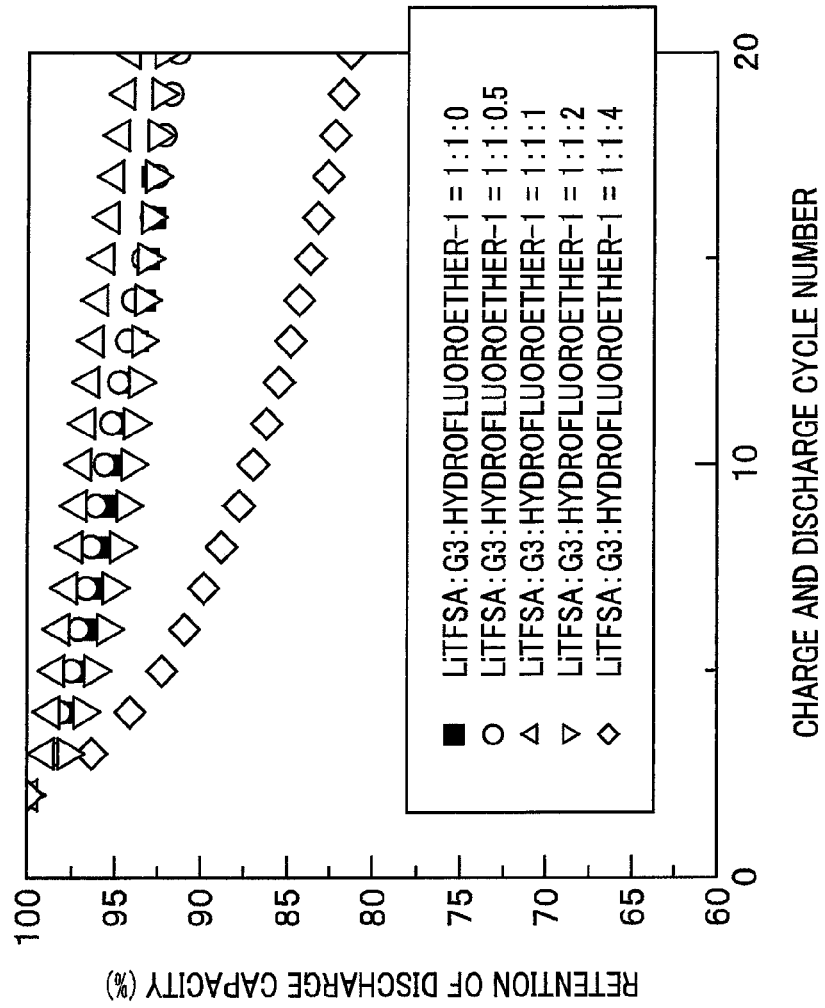
FIG. 12 is a view showing charge and discharge cycle dependence of retention of discharge capacity of a secondary battery in which G3 is used and a mixing ratio of a solvent in an electrolyte solution is changed.

Note that since the positive electrode (sulfur electrode) is produced in a charged state, only a discharge process proceeds in the 1st cycle of the charge and discharge cycle, and a charge and discharge processes proceed from the 2nd cycle. Therefore, the order of charge and discharge is: discharge in the 1st cycle→charge in the 2nd cycle→discharge in the 2nd cycle→charge in the 3rd cycle→discharge in the 3rd cycle. The charge and discharge cycle was performed for 20 cycles. Note that with respect to the "charge and discharge capacity" in FIG. 11, the charge capacity and the discharge capacity in each charge and discharge cycle were separately shown.

Further, the retention of discharge capacity (%) at the 10th cycle was determined by (discharge capacity at the 10th cycle)/(discharge capacity at the 2nd cycle).

(3) Ionic Conductivity

Ionic conductivity was measured by a complex impedance method. Model: VMP2 from Princeton Applied Research Inc. was used as measuring equipment; the frequency range was set to 500 kHz to 1 Hz; and applied voltage was set to 10 mV. An electrolyte solution serving as a sample was charged into a platinized electrode cell (CG-511B from DKK-TOA CORP.) in a glove box, and the cell was sealed for measurement. Note that a cell constant of the platinized electrode cell was previously calculated before measurement by using a standard aqueous KCl solution. Measurement temperature was set to 30° C.

Further, experiments were performed in the same manner using other glymes (G1, G2, G4) (manufactured by Kishida Chemical Co., Ltd.) or G5 (manufactured by NIPPON NYUKAZAI CO., LTD.), or THF (manufactured by Wako Pure Chemical Industries, Ltd.) instead of triglyme (G3), as shown in Tables 2 and 3. Further, experiments were performed in the same manner using, as a solvent, $F_3CH_2C$—O—$CF_2CF_2H$ (fluorine-based solvent; 2,2,2-trifluoroethyl (1,1,2,2-tetrafluoroethyl)ether), manufactured by Asahi Glass Co., Ltd., referred to as "Hydrofluoroether-2"), an ionic liquid ([P13][TFSA]), hydrocarbon (toluene), propylene carbonate (manufactured by Kishida Chemical Co., Ltd.), methyl pentafluoropropionate (abbreviated as "PFPM", an ester-based solvent represented by the following formula) (manufactured by Tokyo Chemical Industry Co., Ltd.), as shown in Tables 2 and 3.

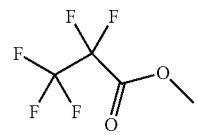

[Formula 4]

Note that, in Example 29, a test was performed using a sodium-sulfur battery in which sodium bis(trifluoromethanesulfonyl)amide (hereinafter referred to as "NaTFSA") represented by formula 6 (manufactured by Kishida Chemical Co., Ltd.) was used instead of the alkali metal salt used in the above Examples, and a sodium metal plate was used instead of the lithium metal plate.

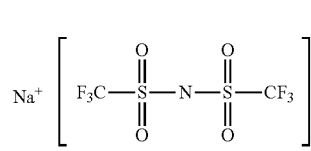

[Formula 5]

The resulting results are shown in Tables 2 to 3.

Each Example shows that coulombic efficiency, cycle characteristics, and retention of discharge capacity are equivalent to or in a slightly poorer level than those in Comparative Examples, but are practically satisfactory.

Figure 8:
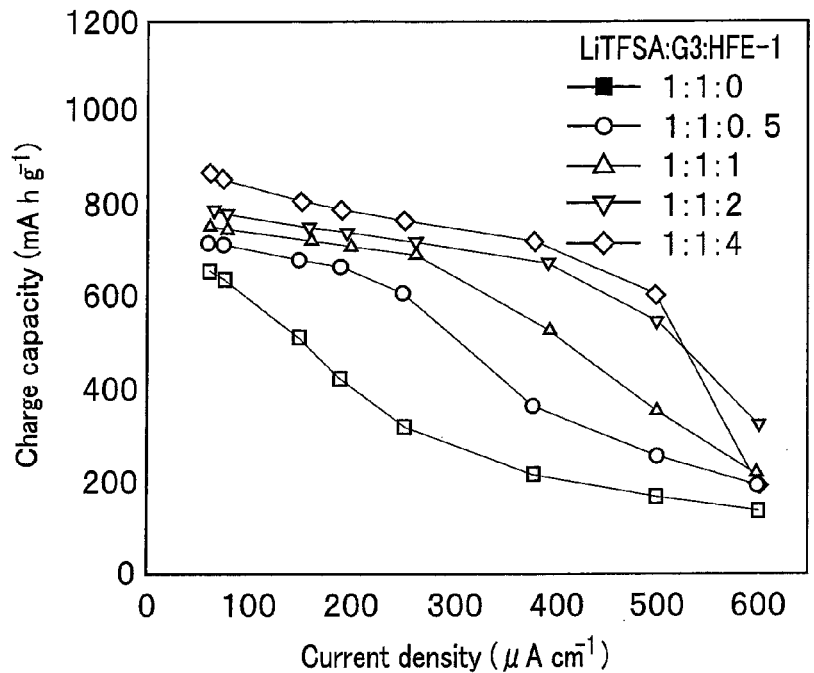
FIG. 8 is a view showing charge rate characteristics of a secondary battery in which G3 is used and a mixing ratio of a solvent in an electrolyte solution is changed.
Figure 9:
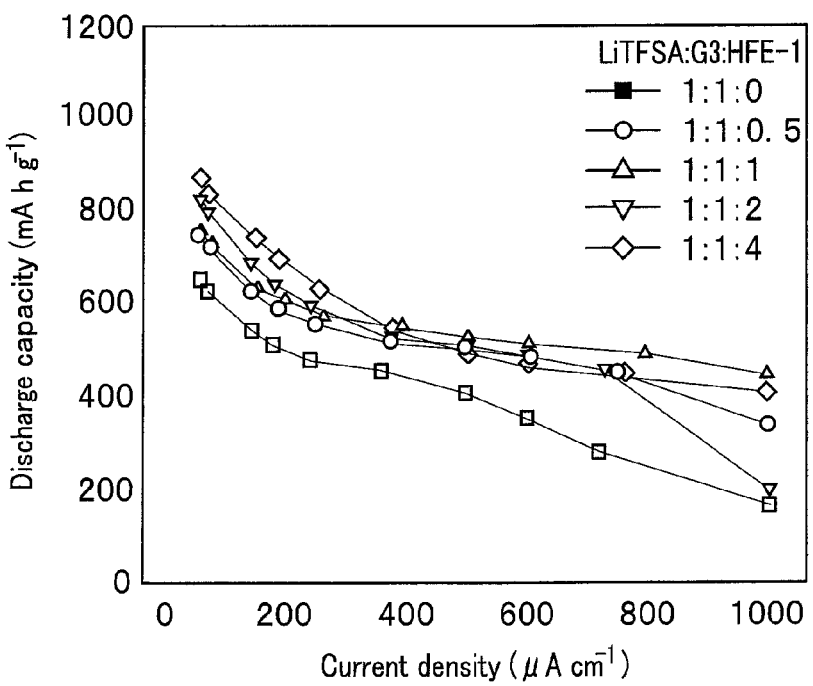
FIG. 9 is a view showing discharge rate characteristics of a secondary battery in which G3 is used and a mixing ratio of a solvent in an electrolyte solution is changed.
Figure 10:
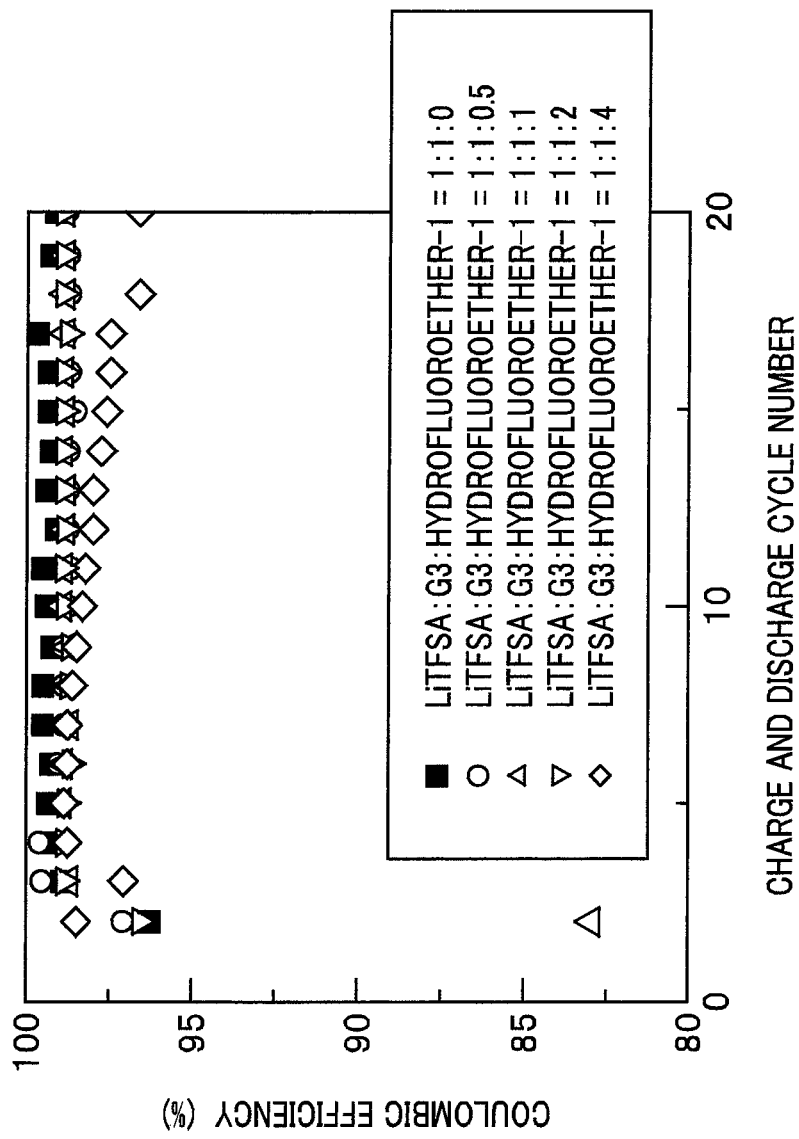
FIG. 10 is a view showing charge and discharge cycle dependence of coulombic efficiency of a secondary battery in which G3 is used and a mixing ratio of a solvent in an electrolyte solution is changed.

Note that FIG. 8 to FIG. 12 show the results when (LiTFSA)/(G3)=1.0 (on a molar basis) was maintained, and the mixing ratio of a solvent was changed to 0.5, 1.0, 2.0, and 4.0. As shown in FIGS. 8 and 9, it is found that, in the case of Examples in which a fluorine-based solvent is added to an electrolyte solution (Examples 1 to 8 in Table 2 to be described below), reduction in charge capacity and discharge capacity is small even if current density is high, and input/output density (electric power that can be taken out) is improved, compared with Comparative Example in which a fluorine-based solvent is not added (Comparative Example 1 in Table 2 to be described below).

Further, when PFPM is used as a solvent, coulombic efficiency, cycle characteristics, and retention of discharge capacity are significantly poorer than those in Examples, and are not suitable for practical use.

TABLE 2

| | | Electrolyte solution | | | | Evaluation of battery characteristics | | | | |
| --- | --- | --- | --- | --- | --- | --- | --- | --- | --- | --- |
| | | Composition | | | | | | | Retention | |
| | Ether compound | LiTFSA/ether compound (on molar basis) | Solvent | Solvent/LiTFSA (on molar basis) | Coefficient of viscosity (mPa s) | Ionic conductivity (mS cm$^{-1}$) | Charge capacity at 1/3 C rate (mA h g$^{-1}$) | Discharge capacity at 1/3 C rate (mA h g$^{-1}$) | Coulombic efficiency at 10th cycle (%) | of discharge capacity at 10th cycle (%) | Discharge capacity at 10th cycle (mA h g$^{-1}$) |
| Example 1 | G3 | 0.5 | Hydrofluoroether-1 | 1.0 | 14.9 | 3.20 | 533 | 623 [a] | 96 | 92 | 998 |
| Example 2 | G3 | 0.5 | Hydrofluoroether-1 | 4.0 | 5.68 | 3.30 | 665 | 787 [a] | 93 | 87 | 887 |

TABLE 2-continued

| | | Electrolyte solution | | | | | Evaluation of battery characteristics | | | | |
| | | Composition | | | | | | | | Retention | |
| | Ether compound | LiTFSA/ether compound (on molar basis) | Solvent | Solvent/LiTFSA (on molar basis) | Coefficient of viscosity (mPa s) | Ionic conductivity (mS cm$^{-1}$) | Charge capacity at 1/3 C rate (mA h g$^{-1}$) | Discharge capacity at 1/3 C rate (mA h g$^{-1}$) | Coulombic efficiency at 10th cycle (%) | of discharge capacity at 10th cycle (%) | Discharge capacity at 10th cycle (mA h g$^{-1}$) |
|---|---|---|---|---|---|---|---|---|---|---|---|
| Example 3 | G3 | 1 | Hydrofluoroether-1 | 0.5 | 60.6 | 1.60 | 606 | 626 | 99 | 96 | 772 |
| Example 4 | G3 | 1 | Hydrofluoroether-1 | 1.0 | 28.1 | 1.70 | 690 | 638 | 99 | 97 | 779 |
| Example 5 | G3 | 1 | Hydrofluoroether-1 | 2.0 | 11.5 | 1.90 | 719 | 687 | 99 | 94 | 903 |
| Example 6 | G3 | 1 | Hydrofluoroether-1 | 4.0 | 4.67 | 2.00 | 763 | 744 | 98 | 87 | 796 |
| Example 7 | G3 | 1.5 | Hydrofluoroether-1 | 1.0 | 39.9 | 0.70 | 907 | 814 | 99 | 105 | 918 |
| Example 8 | G3 | 1.5 | Hydrofluoroether-1 | 4.0 | 5.00 | 0.98 | 881 | 1032 | 97 | 103 | 950 |
| Example 9 | G3 | 1 | Hydrofluoroether-2 | 0.5 | — | 1.80 | 620 | 569 | 97 | 95 | — |
| Example 10 | G3 | 1 | Hydrofluoroether-2 | 1.0 | — | 2.30 | 692 | 639 | 97 | 97 | — |
| Example 11 | G3 | 1 | Hydrofluoroether-2 | 2.0 | — | 2.90 | 718 | 715 | 97 | 96 | — |
| Example 12 | G3 | 1 | Hydrofluoroether-2 | 4.0 | — | 3.10 | 796 | 781 | 97 | 94 | — |
| Comparative Example 1 | G3 | 1 | — | 0.0 | 156 | 1.00 | 323 | 546 | 99 | 95 | 683 |
| Comparative Example 2 | G3 | 1 | G3 | 3.0 | 6.92 | 3.80 | — | — | 87 | 81 | 680 |
| Comparative Example 3 | G3 | 1 | G3 | 7.0 | 3.74 | 3.70 | — | — | 70 | 81 | 600 |
| Example 13 | G4 | 0.5 | Hydrofluoroether-1 | 1.0 | 17.2 | 2.50 | 632 | 729 [a] | 93 [b] | 87 [b] | 1026 |
| Example 14 | G4 | 0.5 | Hydrofluoroether-1 | 4.0 | 6.68 | 3.50 | 780 | 886 [a] | 95 | 89 | 990 |
| Example 15 | G4 | 1 | Hydrofluoroether-1 | 0.5 | 27.3 | 2.30 | 591 | 664 | 99 | 97 | 802 |
| Example 16 | G4 | 1 | Hydrofluoroether-1 | 1.0 | 22.2 | 3.10 | 755 | 651 | 98 | 99 | 921 |
| Example 17 | G4 | 1 | Hydrofluoroether-1 | 2.0 | 11.0 | 4.00 | 783 | 648 | 98 | 95 | 702 |
| Example 18 | G4 | 1 | Hydrofluoroether-1 | 4.0 | 5.22 | 5.20 | 894 | 719 | 98 | 107 | 809 |
| Example 19 | G4 | 2 | Hydrofluoroether-1 | 1.0 | 72.4 | 0.50 | 279 | 781 | 95 | 65 | 624 |
| Example 20 | G4 | 2 | Hydrofluoroether-1 | 4.0 | 5.57 | 1.40 | 739 | 929 | 98 | 102 | 767 |
| Example 21 | G4 | 1 | Hydrofluoroether-2 | 0.5 | — | 2.90 | 710 | 585 | 95 | 87 | — |
| Example 22 | G4 | 1 | Hydrofluoroether-2 | 1.0 | — | 3.60 | 739 | 609 | 93 | 86 | — |
| Example 23 | G4 | 1 | Hydrofluoroether-2 | 2.0 | — | 4.90 | 728 | 664 | 91 | 89 | — |
| Example 24 | G4 | 1 | Hydrofluoroether-2 | 5.0 | — | 7.30 | 849 | 792 | 88 | 93 | — |
| Example 25 | G4 | 1 | [P13][TFSA] | 1.0 | 66.3 | 2.70 | 772 | 614 | 96 | 96 | 751 |
| Example 26 | G4 | 1 | [P13][TFSA] | 4.0 | 55.3 | 3.80 | 759 | 694 | 96 | 90 | 735 |
| Example 27 | G4 | 1 | Toluene | 1.0 | 62.9 | 3.30 | 742 | 778 | 86 | 84 | 554 |
| Example 28 | G4 | 1 | Toluene | 4.0 | 11.5 | 6.00 | 920 | 751 | 78 | 77 | 664 |
| Comparative Example 3 | G4 | 1 | — | 0.0 | 106 | 1.60 | 309 | 520 | 98 | 94 | 706 |
| Comparative Example 4 | G4 | 1 | G4 | 3.0 | 9.66 | 3.20 | — | — | 83 | 84 | 641 |
| Comparative Example 5 | G4 | 1 | Propylene carbonate | 4.0 | 9.09 | 5.50 | — | — | Unevaluable [c] | Unevaluable [c] | Unevaluable [c] |
| Comparative Example 6 | G4 | 1 | PFPM | 4.0 | 2.94 | 5.80 | — | — | Unevaluable [c] | Unevaluable [c] | Unevaluable [c] |
| Example 29 [d] | G5 | 1 | Hydrofluoroether-1 | 4.0 | — | 3.90 | 489 | — | 91 | — | 290 |

[a] 1/3 C Discharge capacity at 1/3 C rate
[b] Value at 8th cycle
[c] Unevaluable because battery life is 10 cycles or less
[d] NaTFSA is used instead of LiTFSA

TABLE 3

| | Electrolyte solution | | | | | Evaluation of battery characteristics | | | | |
| | Composition | | | | | | | | Retention | |
| | Ether compound | LiTFSA/ether compound (on molar basis) | Solvent | Diluent solvent/LiTFSA (on molar basis) | Coefficient of viscosity (mPa s) | Ionic conductivity (mS cm$^{-1}$) | Charge capacity at 1/3 C rate (mA h g$^{-1}$) | Discharge capacity at 1/3 C rate (mA h g$^{-1}$) | Coulombic efficiency at 10th cycle (%) | of discharge capacity at 10th cycle (%) | Discharge capacity at 10th cycle (mA h g$^{-1}$) |
|---|---|---|---|---|---|---|---|---|---|---|---|
| Comparative Example 7 | G2 | 1 | — | — | 602.2 | 0.25 | 79 | 269 | 99 | 91 | 515 |
| Comparative Example 8 | G2 | 0.75 | — | — | 176.9 | 0.62 | 150 | 682 | 99 | 95 | 670 |
| Comparative Example 9 | G2 | 0.25 | — | — | 6.1 | 7.84 | 599 | 692 | 65 | 79 | 654 |
| Example 30 | G2 | 0.75 | Hydrofluoroether-1 | 4.41 | 4.0664 | 3 | 26 | 954 | 99 | 94 | 854 |
| Example 31 | G2 | 0.5 | Hydrofluoroether-1 | 3.81 | 5.61 | 5.52 | 844 | 741 | 93 | 99 | 832 |
| Example 32 | G2 | 1 | Hydrofluoroether-2 | 5.28 | 1.9 | 1.8 | 62 | 678 | 100 | 100 | 951 |
| Example 33 | G2 | 0.6 | Hydrofluoroether-2 | 4.65 | 2.7 | 7.2 | 631 | 506 | 99 | 100 | 670 |
| Example 34 | G2 | 0.5 | Hydrofluoroether-2 | 4.32 | 3.0 | 8.5 | 758 | 670 | 92 | 96 | 774 |
| Comparative Example 10 | G1 | 0.56 | — | — | 47.1 | 1.38 | 716 | 707 | 98 | 94 | 904 |
| Comparative Example 11 | G1 | 0.5 | — | — | 33.9 | 2.88 | 761 | 718 | 97 | 94 | 911 |
| Comparative Example 12 | G1 | 0.4 | — | — | 17.6 | 3.69 | 687 | 693 | 96 | 90 | 987 |
| Comparative Example 13 | G1 | 0.33 | — | — | 10.21 | 5.75 | 659 | 675 | 97 | 89 | 826 |
| Comparative Example 14 | G1 | 0.25 | — | — | 4.65 | 6.82 | 824 | 756 | 96 | 87 | 757 |
| Comparative Example 15 | G1 | 0.1 | — | — | 1.1 | 14.1 | * | 548 | 13 | 31 | 222 |
| Example 35 | G1 | 0.5 | Hydrofluoroether-1 | 4.31 | 3.43 | 3.39 | 788 | 836 | 97 | 97 | 904 |
| Example 36 | G1 | 0.4 | Hydrofluoroether-1 | 3.96 | 3.52 | 4.5 | 753 | 852 | 94 | 96 | 852 |
| Example 37 | G1 | 0.33 | Hydrofluoroether-1 | 3.67 | 3.52 | 4.44 | 742 | 788 | 88 | 86 | 836 |
| Example 38 | G1 | 0.67 | Hydrofluoroether-2 | 5.19 | 1.8 | 2.5 | 130 | 988 | 99 | 67 | 955 |
| Example 39 | G1 | 0.5 | Hydrofluoroether-2 | 4.84 | 1.9 | 4.3 | 803 | 839 | 94 | 100 | 1034 |
| Example 40 | G1 | 0.4 | Hydrofluoroether-2 | 4.47 | 2.0 | 5.5 | 1003 | 998 | 93 | 98 | 843 |
| Example 41 | G1 | 0.33 | Hydrofluoroether-2 | 4.11 | 2.1 | 6.2 | 805 | 817 | 88 | 94 | 917 |
| Comparative Example 16 | THF | 0.67 | — | — | 444.34 | 0.2 | 73 | 416 | 99 | 89 | 741 |
| Comparative Example 17 | THF | 0.5 | — | — | 40.18 | 2.11 | 460 | 668 | 99 | 98 | 811 |
| Comparative Example 18 | THF | 0.33 | — | — | 30.54 | 5.23 | 794 | 758 | 85 | 92 | 696 |
| Comparative Example 19 | THF | 0.25 | — | — | 4.77 | 7.23 | 738 | 711 | 89 | 88 | 650 |
| Comparative Example 20 | THF | 0.17 | — | — | 2.95 | 8.63 | 793 | 688 | 56 | 84 | 592 |
| Example 42 | THF | 0.5 | Hydrofluoroether-1 | 4.53 | 3.0373 | 0.9 | 73 | 909 | 98 | 100 | 1070 |
| Example 43 | THF | 0.33 | Hydrofluoroether-1 | 4 | 3.1022 | 2.49 | 660 | 641 | 99 | 100 | 809 |
| Example 44 | THF | 0.25 | Hydrofluoroether-1 | 3.5 | 3.0535 | 3.82 | 721 | 737 | 94 | 92 | 794 |
| Example 45 | THF | 0.2 | Hydrofluoroether-1 | 2.96 | 2.8544 | 5.14 | 888 | 849 | 87 | 86 | 668 |
| Example 46 | THF | 0.33 | Hydrofluoroether-2 | 4.53 | 1.8 | 2.9 | 780 | 786 | 98 | 100 | 774 |
| Example 47 | THF | 0.25 | Hydrofluoroether-2 | 3.93 | 1.8 | 4.6 | 786 | 748 | 88 | 90 | 712 |
| Example 48 | THF | 0.2 | Hydrofluoroether-2 | 3.33 | 1.9 | 6.0 | 751 | 703 | 68 | 89 | 752 |
| Example 49 | THF | 0.33 | Toluene | 5.87 | 1.5881 | 2.3 | 259 | 225 | 94 | 86 | 464 |
| Example 50 | THF | 0.25 | Toluene | 5.13 | 1.5451 | 3.7 | 695 | 580 | 70 | 82 | 495 |
| Example 51 | THF | 0.2 | Toluene | 4.38 | 1.5413 | 4.94 | 284 | 215 | 78 | 70 | 260 |
| Example 52 | THF | 0.67 | [P13][TFSA] | 2.56 | 83.7 | 2.34 | 695 | 679 | 98 | 100 | 809 |

TABLE 3-continued

| | Electrolyte solution | | | | | Evaluation of battery characteristics | | | | |
|---|---|---|---|---|---|---|---|---|---|---|
| | Composition | | | | | | | | Retention | |
| | Ether compound | LiTFSA/ ether compound (on molar basis) | Solvent | Diluent solvent/ LiTFSA (on molar basis) | Coefficient of viscosity (mPa s) | Ionic conductivity (mS cm$^{-1}$) | Charge capacity at 1/3 C rate (mA h g$^{-1}$) | Discharge capacity at 1/3 C rate (mA h g$^{-1}$) | Coulombic efficiency at 10th cycle (%) | of discharge capacity at 10th cycle (%) | Discharge capacity at 10th cycle (mA h g$^{-1}$) |
| Example 53 | THF | 0.33 | [P13][TFSA] | 2.1 | 18.6 | 3.79 | 739 | 674 | 100 | 94 | 670 |
| Example 54 | THF | 0.2 | [P13][TFSA] | 1.57 | 11.4 | 8.01 | 642 | 695 | 85 | 78 | 708 |

* Unevaluable because side reaction has occurred in the inner part of battery (charge capacity: 1672 mAh/g or more)

Examples 55 to 65

Comparative Examples 21 to 24

Experiments were performed in the same manner as in Example 24 using, as a binder, PALi, Nafion-Li, and PAA as each described above, and using other glymes (G1, G2) (manufactured by Kishida Chemical Co., Ltd.) or THF (manufactured by Wako Pure Chemical Industries, Ltd.) instead of tetraglyme (G4), as shown in Table 4.

As shown in Table 4, when PALi or Nafion-Li was used as a binder in the positive electrode, charge and discharge capacity was equivalent and coulombic efficiency was improved by about 1% as compared with the case where PVA was used as a binder. Note that even when coulombic efficiency is improved by only 1%, a reduction in charge and discharge capacity can be significantly suppressed, for example, after 1000 cycles of charge and discharge because an improvement effect of coulombic efficiency acts exponentially. Note that when PAA which contains Li as a counter ion and does not have a side chain was used as a binder, discharge capacity was reduced compared with PVA because the permeation of the electrolyte solution to the positive electrode was not good.

REFERENCE SIGNS LIST

2 Positive electrode
4 Negative electrode (counter electrode)
50 Lithium-sulfur battery (alkali metal-sulfur-based secondary battery)

The invention claimed is:

1. An alkali metal-sulfur-based secondary battery comprising:
a positive electrode or a negative electrode containing at least one sulfur-based electrode active material selected from the group consisting of elemental sulfur, a metal sulfide, a metal polysulfide and an organic sulfur compound;
an electrolyte solution containing a complex comprising a salt of an alkali metal and an ether compound represented by the following Formula 1:

$$R^1-(OCHR^3CH_2)_x-OR^2 \quad \text{(Formula 1)}$$

wherein $R^1$ and $R^2$ are each independently selected from the group consisting of an alkyl group having 1 to 9 carbon atoms which is unsubstituted or substituted with fluorine, a phenyl group which is unsubstituted or sub-

TABLE 4

| | Electrolyte solution | | | | | | Evaluation of battery characteristics | | | |
|---|---|---|---|---|---|---|---|---|---|---|
| | Composition | | | | | | | | | |
| | Ether compound | LiTFSA/ ether compound (on molar basis) | Solvent | Solvent/ LiTFSA (on molar basis) | Coefficient of viscosity (mPa s) | Ionic conductivity (mS cm$^{-1}$) | Binder | Coulombic efficiency at 10th cycle (%) | Retention of discharge capacity at 10th cycle (%) | Discharge capacity at 10th cycle (mA h g$^{-1}$) |
| Example 24 | G4 | 1 | Hydrofluoroether-2 | 5 | 2.5 | 7.3 | PVA | 88 | 93 | 813 |
| Comparative Example 21 | G4 | 1 | Nothing | — | 106.0 | 1.6 | PAA | 98 | 95 | 629 |
| Comparative Example 22 | G4 | 1 | Nothing | — | 106.0 | 1.6 | PALi | 99 | 96 | 743 |
| Comparative Example 23 | G4 | 1 | Nothing | — | 106.0 | 1.6 | Nafion Li | 99 | 93 | 711 |
| Comparative Example 24 | G4 | 1 | Nothing | — | 106.0 | 1.6 | PVA | 98 | 95 | 742 |
| Example 55 | G4 | 1 | Hydrofluoroether-2 | 5 | 2.5 | 7.3 | PAA | 95 | 92 | 678 |
| Example 56 | G4 | 1 | Hydrofluoroether-2 | 5 | 2.5 | 7.3 | PALi | 98 | 98 | 828 |
| Example 57 | G4 | 1 | Hydrofluoroether-2 | 5 | 2.5 | 7.3 | Nafion Li | 94 | 88 | 749 |
| Example 58 | THF | 0.25 | Hydrofluoroether-2 | 3.93 | 1.8 | 4.6 | PALi | 89 | 91 | 760 |
| Example 59 | THF | 0.25 | Hydrofluoroether-2 | 3.93 | 1.8 | 4.6 | PVA | 88 | 90 | 712 |
| Example 60 | G1 | 0.5 | Hydrofluoroether-2 | 4.84 | 1.9 | 4.3 | PALi | 97 | 90 | 815 |
| Example 61 | G1 | 0.5 | Hydrofluoroether-2 | 4.84 | 1.9 | 4.33 | Nafion Li | 96 | 79 | 1044 |
| Example 62 | G2 | 0.5 | Hydrofluoroether-2 | 4.32 | 3.0 | 8.46 | Nafion Li | 94 | 82 | 815 |
| Example 63 | G1 | 0.5 | Hydrofluoroether-2 | 4.84 | 1.9 | 4.3 | PVA | 94 | 100 | 1034 |
| Example 64 | G2 | 0.5 | Hydrofluoroether-2 | 4.32 | 3.0 | 8.5 | PALi | 94 | 89 | 789 |
| Example 65 | G2 | 0.5 | Hydrofluoroether-2 | 4.32 | 3.0 | 8.5 | PVA | 92 | 96 | 774 | stituted with a halogen atom, and a cyclohexyl group which is unsubstituted or substituted with a halogen atom, wherein $R^1$ and $R^2$ may be combined together to form a ring; $R^3$ each independently represents H or $CH_3$; and x represents 1 to 6; and a counter electrode, which is a counter electrode of the positive electrode or the negative electrode, and contains the alkali metal, an alloy containing the alkali metal, carbon, or an active material which intercalates and deintercalates an ion of the alkali metal, wherein the electrolyte solution further contains, in addition to the complex, a solvent comprising a fluorine-based solvent or an ionic liquid, which does not chemically react with the alkali metal and an alkali metal polysulfide of the formula $M_2S_n$, wherein $1 \leq n \leq 8$, a molar ratio of the solvent to the salt of the alkali metal salt is 0.50 or more and 6.0 or less, and a molar ratio of the salt of the alkali metal to the ether compound is 0.50 or more and not more than a value determined by the saturation concentration of the salt of the alkali metal in the ether compound.

2. The alkali metal-sulfur-based secondary battery according to claim 1, wherein the ether compound is triglyme or tetraglyme.

3. The alkali metal-sulfur-based secondary battery according to claim 2, wherein the solvent is hydrofluoroether.

4. The alkali metal-sulfur-based secondary battery according to claim 3, wherein the salt of the alkali metal is represented by MX, wherein M is an alkali metal, and X is at least one moiety selected from the group consisting of Cl, Br, I, $BF_4$, $PF_6$, $CF_3SO_3$, $ClO_4$, $CF_3CO_2$, $AsF_6$, $SbF_6$, $AlCl_4$, $N(CF_3SO_2)_2$, $N(CF_3CF_2SO_2)_2$, $PF_3(C_2F_5)_3$, $N(FSO_2)_2$, $N(FSO_2)(CF_3SO_2)$, $N(CF_3CF_2SO_2)_2$, $N(C_2F_4S_2O_4)$, $N(C_3F_6S_2O_4)$, $N(CN)_2$, $N(CF_3SO_2)(CF_3CO)$, $R^4FBF_3$ (wherein $R^4F=n-C_mF_{2m+1}$, m=a natural number of 1 to 4), and $R^5BF_3$ (wherein $R^5=n-C_pH_{2p+1}$, p=a natural number of 1 to 5).

5. The alkali metal-sulfur-based secondary battery according to claim 4, wherein at least either the positive electrode or the negative electrode contains a conducting material and a binder comprising an anionic polymer.

6. The alkali metal-sulfur-based secondary battery according to claim 5, wherein the anionic polymer is polyacrylic acid, an alkali metal salt of polyacrylic acid, or

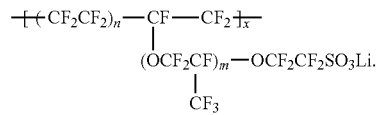

7. The alkali metal-sulfur-based secondary battery according to claim 3, wherein the alkali metal is lithium.

8. The alkali metal-sulfur-based secondary battery according to claim 7, wherein the alkali metal salt is lithium bis(trifluoromethanesulfonyl)amide.

9. The alkali metal-sulfur-based secondary battery according to claim 8, wherein the hydrofluoroether is 1,1,2,2-tetrafluoroethyl(2,2,3,3-tetrafluoropropyl)ether, or 2,2,2-trifluoroethyl(1,1,2,2-tetrafluoroethyl)ether.

10. An alkali metal-sulfur-based secondary battery, comprising:
an electrolyte solution containing a complex comprising a lithium salt and glyme, and a hydrofluoroether that does not chemically react with a lithium polysulfide, wherein a molar of the hydrofluoroether to the lithium salt being 0.50 or more and 6.0 or less, and a molar ratio of the lithium salt to the glyme being 0.50 or more and not more than the saturation concentration of the lithium salt in the glyme;
a positive electrode or a negative electrode containing a sulfur-based active material; and
a counter electrode which intercalates and deintercalates a lithium ion.

11. The alkali metal-sulfur-based secondary battery according to claim 10, wherein the glyme is triglyme or tetraglyme.

12. The alkali metal-sulfur-based secondary battery according to claim 10, wherein the lithium salt is lithium bis(trifluoromethanesulfonyl)amide.

13. The alkali metal-sulfur-based secondary battery according to claim 10, wherein the hydrofluoroether is 1,1,2,2-tetrafluoroethyl(2,2,3,3-tetrafluoropropyl)ether, or 2,2,2-trifluoroethyl(1,1,2,2-tetrafluoroethyl)ether.

* * * * *